US012165234B2

(12) United States Patent
Lewandowski et al.

(10) Patent No.: US 12,165,234 B2
(45) Date of Patent: Dec. 10, 2024

(54) PROCESS FOR SECURING A LOGISTICS AREA

(71) Applicant: Comnovo GmbH, Dortmund (DE)

(72) Inventors: Andreas Lewandowski, Dortmund (DE); Ron Winkler, Dortmund (DE); Arthur Muhlbeier, Dortmund (DE); Dominik Gerstel, Dortmund (DE)

(73) Assignee: Comnovo GmbH, Dortmund (DE)

( * ) Notice: Subject to any disclaimer, the term of this patent is extended or adjusted under 35 U.S.C. 154(b) by 542 days.

(21) Appl. No.: 17/319,443

(22) Filed: May 13, 2021

(65) Prior Publication Data

US 2021/0358069 A1 Nov. 18, 2021

(30) Foreign Application Priority Data

May 13, 2020 (DE) .......................... 102020113010.4

(51) Int. Cl.
*G06Q 10/08* (2024.01)
*B65G 69/28* (2006.01)
*G06Q 50/26* (2012.01)

(52) U.S. Cl.
CPC ....... *G06Q 50/265* (2013.01); *B65G 69/2882* (2013.01); *G06Q 10/08* (2013.01)

(58) Field of Classification Search
CPC ... G06Q 50/265; G06Q 10/08; B65G 69/2882
See application file for complete search history.

(56) References Cited

U.S. PATENT DOCUMENTS

2016/0327951 A1 11/2016 Walton et al.

FOREIGN PATENT DOCUMENTS

| DE | 102010005034 A1 | * | 7/2011 | .............. B66F 9/063 |
| DE | 102013003593 A1 | * | 9/2013 | .............. G06F 3/0611 |
| DE | 102016113312 A1 | * | 1/2018 | .............. B66F 17/003 |
| DE | 202018105041 U1 | | 12/2019 | |

* cited by examiner

*Primary Examiner* — Aryan E Weisenfeld
*Assistant Examiner* — Jeffrey R Chalhoub
(74) *Attorney, Agent, or Firm* — Wood Herron & Evans LLP

(57) ABSTRACT

A method is provided for safeguarding a logistics area. The method includes monitoring a first control zone; detecting whether a first vehicle module is present in the control zone; and setting a safety status indicator in a first vehicle processing unit of the first vehicle module in response to detecting the first vehicle module in the control zone. The method also includes maintaining the safety status indicator in the first vehicle processing unit, even when the first vehicle module is leaving the control zone. Additional steps include monitoring an enabling zone; detecting whether the first vehicle module is present in the enabling zone, and deleting the first safety status indicator when it is detected that the first vehicle module is present in the enabling zone.

20 Claims, 14 Drawing Sheets

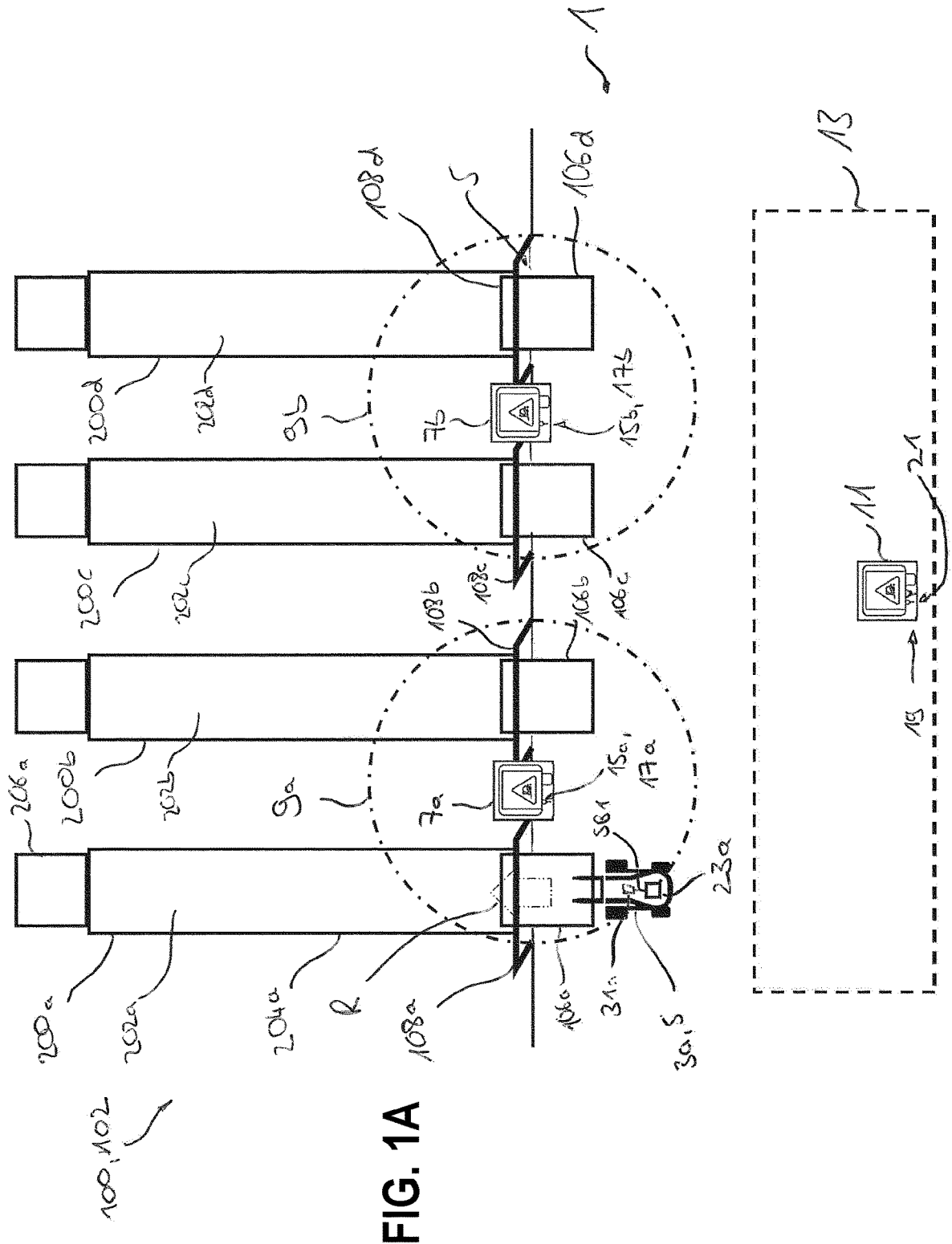

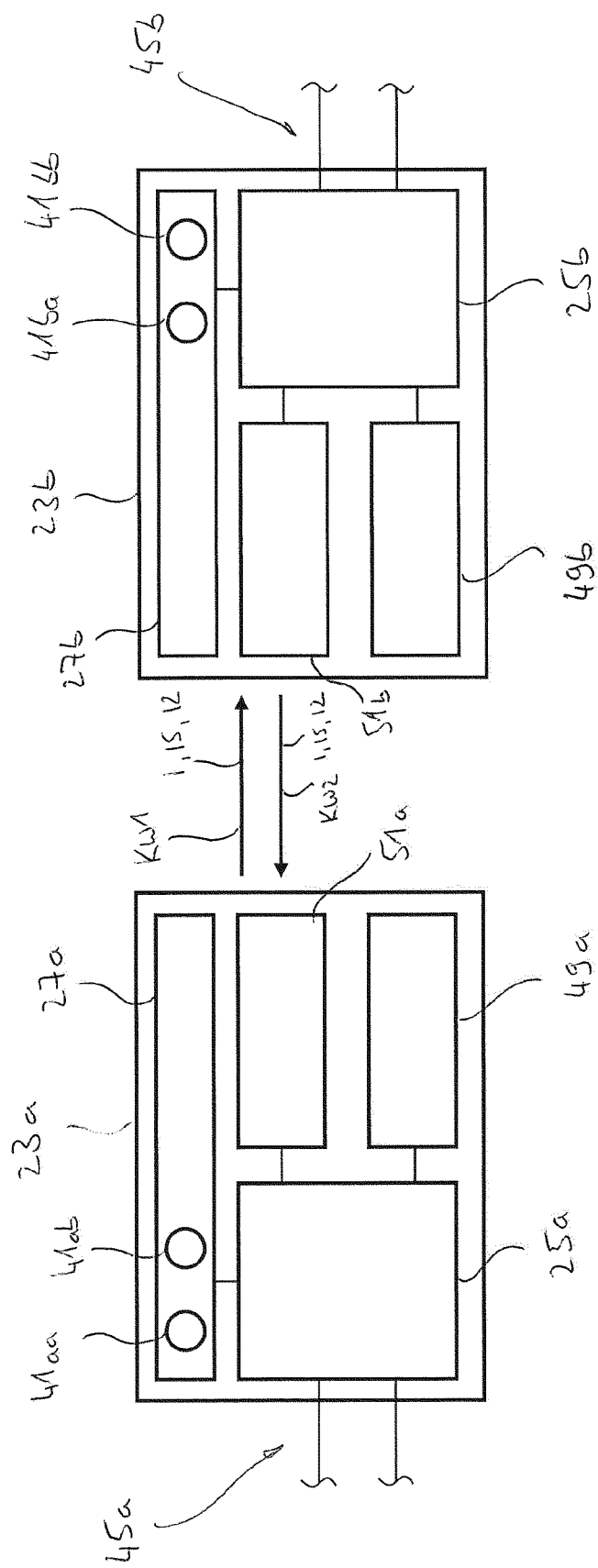

PROCESS FOR SECURING A LOGISTICS AREA

CROSS-REFERENCE TO RELATED APPLICATION

This application is related to and claims priority to German Patent Application No. DE 102020113010.4, filed on May 13, 2020, the entire content of which is herein incorporated by reference.

TECHNICAL FIELD

The invention relates to a method for safeguarding a logistics area, particularly a loading zone, comprising the steps: monitoring a control zone which is a sub-region of a first three-dimensional electromagnetic field provided by a control antenna unit and detecting whether a first vehicle module is present in the control zone, wherein the vehicle module is mounted on a first vehicle, particularly an industrial truck and/or an autonomous driving vehicle, and matched to the control antenna unit.

BACKGROUND

Due to limited storage capacities, closely synchronised processes and the widespread just-in-time strategy, it is often necessary in logistics areas to make goods transport and handling of goods in logistics areas particularly efficient. This results in a high time pressure on drivers of vehicles, particularly of industrial trucks, such as forklifts. Incoming and outgoing deliveries of goods must, as quickly as possible, be loaded into the transport vehicles provided or unloaded from the delivering transport vehicles. In modern logistics areas, a loading zone for loading and unloading transport vehicles is usually approximately at the same height as a loading area of a transport vehicle, which enables the fastest possible loading and unloading. Loading ramps are usually provided in order to bridge a gap between the loading zone and the loading area of the transport vehicle. Said loading ramps can be placed manually on the loading ramp or they can be driven electrically, pneumatically or hydraulically. Although modern loading ramps are often equipped with lips intended to provide the most continuous transition possible between the loading ramp and the loading area, an edge of the loading ramp usually has to be driven over by an industrial truck when loading and unloading the vehicle.

A variety of problems can be caused when said edges are driven over too quickly. The tires of an industrial truck are subject to increased wear when the edge between the loading ramp and the loading area is driven over too quickly. Said wear causes breakdowns of industrial trucks and increased maintenance costs. In addition, there is noise which, particularly in densely populated areas, can lead to a lack of acceptance relative to the logistics area and to the health of the staff. Furthermore, driving over the edge can also cause vibrations, which can lead to transport goods falling down and/or damage to sensitive transport goods. In addition, the edge can trigger an impact on the vehicle, which is translated into human vibration, which, with long-term and regular exposure, can damage the health of an industrial truck driver.

A further problem in the logistics area are damages to infrastructure, transport vehicles and industrial trucks which are caused by a lifting unit of the industrial truck that is too high. If, for example, a lift mast of a forklift, which is provided for lifting transport goods, is raised too far while the forklift is present on a loading area of a transport vehicle, a cover of the loading area of the transport vehicle can be damaged.

Furthermore, collisions between a plurality of vehicles, which can cause property damage and personal injury, often occur in logistics areas. If a forklift is present on the loading area of a transport vehicle or in an aisle area, it is difficult or impossible to see it from an area in front of the loading ramp. A collision can occur If a second industrial truck drives past the loading ramp while the forklift is simultaneously entering the loading zone via the loading ramp. A similar problem also arises with aisles on storage areas when a first industrial truck is leaving an aisle, such as an intermediate aisle formed by two shelves, and a second industrial truck simultaneously drives through an exit area of said aisle.

Various methods and systems for safeguarding vehicles are known from the prior art. DE 20 2018 105 041 U1 of the present applicant discloses a gate safety system for preventing collisions between a vehicle and a gate. A gate module disposed on the gate defines a gate warning zone and detects whether a vehicle module matched thereto is present within the gate warning zone. A gate processing unit is further set up for sending a braking signal to the vehicle module in order to brake a vehicle on which the vehicle module is mounted. However, this requires permanent monitoring of the vehicles.

Furthermore, a method for warning people in traffic is also known from WO 2018/015315 A1 by the present applicant, wherein a warning zone is monitored and it is determined whether a warning module is present within the warning zone. A warning signal can be output in response to detecting the warning module within the warning zone. This disclosure is based on the problem that frequent false warnings can desensitise the operating personnel and reduce a safety effect, which is to be avoided by a special design of the warning zones. Special requirements of loading zones are not taken into account.

The object of the present invention is therefore to provide a method which is suitable for safeguarding a logistics area and which offers improved safety compared to the prior art.

SUMMARY

The invention solves this problem in a method indicated above comprising the steps: setting a safety status indicator in a first vehicle processing unit of the first vehicle module in response to the detection of the first vehicle module in the control zone; maintaining the safety status indicator in the first vehicle processing unit, even when the first vehicle module is leaving the control zone; monitoring an enabling zone; detecting whether the first vehicle module is present in the enabling zone and deleting the first safety status indicator when it is detected that the first vehicle module is present in the enabling zone. The term processing unit (e.g., a vehicle processing unit, a control processing unit, an enabling processing unit), as used herein, is also referred to as a processor (e.g., a vehicle processor, a control processor, an enabling processor).

According to the invention, the safety status indicator is thus retained during operation until the first vehicle module or the first vehicle enters the enabling zone or is present therein. As soon as the first vehicle module has been registered in the control zone, no further monitoring of said first vehicle module is necessary, which achieves the simplest possible performance of the method. Furthermore, failure safety is increased since the safety status indicator is also set when a control module, which preferably defines the control zone, should have an error after the safety status indicator has been set. For example, the safety status indicator can also be set when the control module fails and a control zone is no longer defined. The method preferably further comprises: setting a vehicle safety status indicator in a first vehicle control unit of the first vehicle in response to the detection of the first vehicle module in the control zone and/or in response to the setting of the safety status indicator in the first vehicle processing unit, and maintaining the vehicle safety status indicator in the first vehicle control unit of the first vehicle, even when the first vehicle module is leaving the control zone and/or when the first vehicle module has an error. Failure safety can be further increased by additionally setting a vehicle safety status indicator. The vehicle safety status indicator is thus retained even when the first vehicle module is damaged and/or has a fault.

The steps of the method can further advantageously ensure that only the entry of the first vehicle needs to be captured and no sustained monitoring of a vehicle present in the control zone is necessary. The invention is based on the knowledge that the logistics areas to be safeguarded often only have a single access and therefore only said access has to be monitored in order to avoid collisions. Furthermore, a spatial extent of the control zone can be restricted without reducing the functionality of the method. If the control zone is selected, for example, so that said control zone covers a loading ramp, the safety status indicator is set and also maintained when the first vehicle is present on a loading area of a transport vehicle. The entire loading area of the vehicle does not have to be covered by the control zone, which can increase the processing efficiency of a system performing the method. The safety status indicator is deleted when the vehicle enters an enabling zone. The enabling zone is preferably disposed adjacent to the control zone. Furthermore, the enabling zone and the control zone can preferably also be implemented to overlap. The safety status indicator is preferably only deleted when it is detected that the first vehicle module is present exclusively in the enabling zone. However, it can also be provided for the control zone and the enabling zone to be implemented spaced apart from one another. For example, the enabling zone can be disposed in a gate area forming a transition between an unloading area having loading ramps and a main storage area of a warehouse. The step of detecting whether the first vehicle module is present in the control zone preferably comprises: detecting by the control processing unit that the first vehicle module is present in the control zone; sending a configuration of the control zone to the first vehicle module and detecting by the first vehicle module whether the first vehicle module is present in the control zone using the received configuration of the control zone. The configuration of the control zone comprises at least one spatial shape of the control zone, particularly a projection of the control zone onto an area travelled by vehicles.

The safety status indicator preferably identifies a specific state of the first vehicle processing unit and/or of a computer program executed on the vehicle processing unit. The safety status indicator is particularly preferably a digital status indicator, which can also be referred to as a flag. The safety status indicator preferably determines an operating state of the vehicle processing unit. The monitoring of a control zone preferably comprises the steps of generating a first three-dimensional electromagnetic field by means of a control antenna unit, defining the control zone which is a sub-region of the first three-dimensional electromagnetic field by means of a control processing unit, and monitoring the control zone by the control processing unit.

In a first preferred embodiment of the method, performed in addition to deleting the first safety status indicator: replacing the safety status indicator with a second status indicator in the first vehicle processing unit of the first vehicle module when it is detected that the first vehicle module is present in the enabling zone. The second status indicator preferably determines a second operating state of the vehicle processing unit, which second status indicator particularly preferably corresponds to a regular operating state. However, it can also be provided that the second vehicle indicator is used to identify the first vehicle. For example, goods tracking can thus be facilitated by means of the second vehicle indicator.

According to a preferred refinement, the method further comprises: Restricting at least one degree of freedom of movement of the first vehicle when the safety status indicator is set in the first vehicle processing unit. The first vehicle module is preferably connected to a controller of the first vehicle, wherein the method comprises the steps of providing a restriction signal to the controller of the first vehicle by means of the first vehicle module.

It should be understood that more than one degree of freedom of movement of the first vehicle can also be restricted when the safety status indicator is set.

The method preferably further comprises: enabling the at least one degree of freedom of movement of the first vehicle when the safety status indicator is deleted from the first vehicle processing unit. Furthermore, the method preferably further comprises: enabling the at least one degree of freedom of movement of the first vehicle when the second status indicator is set in the first vehicle processing unit. However, it can also be provided that another degree of freedom of movement is restricted or that the at least one degree of freedom of movement of the first vehicle is restricted in a different manner when the second status indicator is set. For example, a restriction of a first degree of freedom of movement of the vehicle can be lifted and a restriction of a second degree of freedom of movement can be maintained less intensively, for example, only to 50% of the maximum restriction, or less. Thus, for example, when the second status indicator is set instead of the first status indicator, an achievable maximum speed of the vehicle can be increased and a maximum steering angle of the vehicle can be enabled or the restriction thereof can be lifted.

The degree of freedom of movement is preferably selected from one of the following parameters: driving speed of the vehicle, curve radius, lifting height of a lifting unit of the vehicle, acceleration of the vehicle, possible direction of travel of the first vehicle, particularly forward travel and/or reverse travel of the first vehicle, maximum attainable driving speed when travelling forwards with the first vehicle, maximum attainable driving speed when travelling backward with the first vehicle, enabled range of movement of the vehicle. For example, in order to avoid damage to the wheels of the first vehicle, it may be desirable for a maximum driving speed of the vehicle to be limited when the vehicle is in the area of a loading ramp. Furthermore, the risk that another vehicle will be overlooked and/or that the first vehicle will be overlooked by the driver of another vehicle decreases with decreasing speed. Furthermore, a restriction of the minimum curve radius and/or maximum curve radius of the vehicle can prevent damage caused by sudden, strong steering movements. Restricting a maximum acceleration of the vehicle prevents cargo from falling. Furthermore, a lifting height of a lifting unit of the vehicle can be restricted.

For example, a lift mast of a forklift cannot exceed a maximum height, which prevents damage to the covers of loading areas of transport vehicles or transport units such as containers or collisions with loading gates. Furthermore, an enabled movement area of the vehicle can also be defined. For example, access of the vehicle to a predetermined sub-region of the logistics area can be restricted and/or prevented when the first safety status indicator is set. This is particularly desirable when the vehicle is an autonomous vehicle.

The step of detecting whether a first vehicle module is present in the first control zone is preferably performed by the first vehicle module. A particularly high level of failure safety can be guaranteed in this way. However, it can also be provided for the determination of whether a first vehicle is present in the first control zone to be performed by the control module. The control module is then preferably implemented for providing a signal to the vehicle module by means of the control module antenna unit, the signal representing when the vehicle module is in the control zone.

In a preferred refinement, the method further comprises: defining a first vehicle warning zone for the first vehicle, which first vehicle warning zone is a sub-region of a third electromagnetic field provided by a first vehicle antenna unit on the first vehicle; detecting whether a second vehicle module matched to the first vehicle warning zone is present in the first vehicle warning zone; capturing a status indicator set in a second vehicle processing unit of the second vehicle module; comparing the status indicator set in the first vehicle processing unit with the status indicator set in the second vehicle processing unit; and performing at least one follow-on operation when the status indicator set in the second vehicle processing unit differs from or is the same as the status indicator set in the first vehicle processing unit. A vehicle warning zone can therefore also be defined for the first vehicle. By comparing the status indicators set in the first vehicle processing unit and the second vehicle processing unit, it is possible to distinguish between vehicles that are present or have been present in the area of the control zone and vehicles that are not present in the control zone or are within the enabling zone. It can thus be achieved in an advantageous manner that the follow-on operation is only performed when the status indicators set in the vehicle modules differ, wherein the status indicators also differ when a status indicator is set in only one of the processing units. For example, if the control zone covers a loading ramp, the safety status indicator is set when the vehicle drives onto the loading area of a transport vehicle. A plurality of transport vehicles is often positioned adjacent to one another and are unloaded simultaneously. If a second transport vehicle is unloaded by a second vehicle, the safety status indicator is also set in a second vehicle processing unit when it drives onto the loading area thereof. A status indicator of the first vehicle processing unit and a status indicator of the second vehicle processing unit match and no follow-on operation is performed. Preferably, a plurality of first vehicle warning zones can also be defined for the first vehicle, which particularly preferably have varying geometric definitions. For example, a smaller circular vehicle warning zone can be surrounded by a larger vehicle warning zone.

The method preferably further comprises: changing a configuration of the first vehicle warning zone in response to detecting the first vehicle module in the control zone and/or changing a configuration of the first vehicle warning zone when it is detected that the first vehicle module is present in the enabling zone. The configuration of the vehicle warning zone preferably comprises at least one geometric configuration of the vehicle warning zone. Thus, a size of the vehicle warning zone can preferably be reduced in response to detecting the first vehicle module in the control zone. Furthermore, the geometric configuration can preferably also be changed. For example, the first vehicle warning zone can be changed from a round vehicle warning zone, which is uniformly defined around the vehicle, to a vehicle warning zone extending elongated forward in the direction of travel of the vehicle when the first vehicle module is detected in the control zone. The method preferably further comprises: sending a status indicator set in the first vehicle processing unit of the first vehicle module, preferably to the second vehicle module, when it is detected that the second vehicle module is present in the first vehicle warning zone.

The first vehicle module is preferably implemented for sending a configuration of the first vehicle warning zone to the second vehicle module when it is detected that the second vehicle module is present in the first vehicle warning zone. The method particularly preferably comprises the step of sending the status indicator set in the first vehicle processing unit to the second vehicle module when it is detected that the second vehicle module is present within the first vehicle warning zone.

According to a preferred refinement, the method further comprises: defining a second vehicle warning zone for the second vehicle, which second vehicle warning is a subregion of a fourth three-dimensional electromagnetic field provided by a second vehicle antenna unit; receiving a configuration of the second vehicle warning zone of the second vehicle at the first vehicle module; detecting by the first vehicle module whether the first vehicle module is present in the second vehicle warning zone. A status indicator set in the first vehicle processing unit is particularly preferably only sent when it is detected that the first vehicle module is present in the second vehicle warning zone. It should be understood that both vehicle modules can preferably be implemented for sending a configuration of the respective warning zone defined by said vehicle module. Furthermore, both vehicle modules are preferably implemented for sending the respectively set status indicator.

The method preferably further comprises: detecting whether the first vehicle module and the second vehicle module are approaching one another. Both the first vehicle module and the second vehicle module are preferably implemented for detecting whether the first vehicle module and the second module are approaching one another. However, it can also be provided that only the first vehicle module or only the second vehicle module is implemented for detecting that the vehicle modules are approaching one another. The at least one follow-on operation is preferably only performed when it is detected that the first vehicle module and the second vehicle module are approaching one another.

In a preferred refinement of the method, the follow-on operation comprises at least one of the following steps: providing a warning signal at the first vehicle; providing a warning signal at the second vehicle; restricting at least one degree of freedom of movement of the first vehicle; and/or restricting at least one degree of freedom of movement of the second vehicle. It should be understood that the restriction on the degree of freedom of movement of the first vehicle and the restriction on the degree of freedom of movement of the second vehicle may be identical. However, it is also possible that different degrees of freedom of movement of the vehicles are restricted, or that an identical degree of freedom of movement is restricted to different degrees. The restriction of the degree of freedom of movement when approaching is preferably identical to that restriction of the degree of freedom of movement of the vehicle when the safety status indicator is set.

The first control zone preferably covers a transition area between a loading ramp and a transport vehicle to be loaded or unloaded. However, it can also be provided that the control zone covers an access area to an aisle, particularly an aisle formed by shelves.

In a preferred embodiment, the method comprises: detecting whether the first vehicle module mounted on the first vehicle is present on a loading area of the transport vehicle. It is preferably detected that the first vehicle module is present on the loading area of the transport vehicle when the vehicle module is leaving the control zone at a predefined border area. The method particularly preferably comprises the step: detecting a direction of travel of the vehicle when the first vehicle module is leaving the control zone. For example, it can be detected that the vehicle is disposed on a loading area of the transport vehicle when the vehicle module is leaving the control zone in a certain direction.

The method preferably further comprises: detecting whether the transport vehicle is moving; and at least one of the steps: providing a warning signal at the first vehicle module; braking the first vehicle to a stop; when it is detected that the transport vehicle is moving and the first vehicle module is present on the loading area of the transport vehicle. Said steps can prevent the first vehicle from falling from the loading area of the transport vehicle when the transport vehicle accidentally starts moving and thereby moves away from the loading ramp.

In a preferred refinement, the method comprises: detecting whether the first vehicle module mounted on the first vehicle is leaving the loading area of the transport vehicle. This can ensure that all vehicles have left the loading area before the transport vehicle departs, so that accidents and thefts can be avoided. The method preferably further comprises: detecting a dwell time of the first vehicle module on the loading area of the transport vehicle. Particularly preferably, the method also comprises: comparing the detected dwell time of the first vehicle module on the loading area with a predefined dwell time limit value and further preferably providing a dwell time warning signal when the detected dwell time exceeds the dwell time limit value. For example, a dwell time of a vehicle module that exceeds the dwell time limit value can indicate an emergency situation on the loading area and thus increase safety. Theft of vehicles can further be avoided.

The method preferably further comprises: capturing an image of the first vehicle, the transport vehicle and/or a load of the first vehicle when it is detected that the first vehicle module is leaving the loading area of the transport vehicle. Capturing an image enables documentation of the state of the transport vehicle, the load and/or the first vehicle at the time of loading or unloading, by which documentation any damage can be traced. For example, it can be detected whether a consignment of goods was already damaged when it was delivered.

The method preferably further comprises: detecting an open state of a gate disposed in the first control zone, wherein the step of monitoring a first control zone only takes place when it is detected that the gate is open. In an advantageous manner, this thus achieves the safety status indicator only being set when driving through the gate. If, on the other hand, the gate is closed, it is usually not necessary to set the safety status indicator. Furthermore, a closed gate usually does not have to be monitored, which saves resources.

According to a second consideration, the invention achieves the aforementioned object with a logistics safety system for safeguarding a logistics area, comprising a control module comprising a control antenna unit, comprising at least one first control antenna implemented for being mounted in a predetermined spatial relationship to a loading zone of the logistics area, and for generating a first three-dimensional electromagnetic field, a control processing unit connected to the control antenna unit, which control processing unit is adapted for defining at least one control zone for the loading zone, which control zone is a sub-region of the first three-dimensional electromagnetic field; an enabling module comprising an enabling antenna unit comprising at least one first enabling antenna implemented for generating a second three-dimensional electromagnetic field, an enabling processing unit connected to the enabling antenna unit, which enabling processing unit is adapted for defining at least one enabling zone which is a sub-region of the second three-dimensional electromagnetic field, and comprising a first vehicle module for a first vehicle, comprising a first vehicle antenna unit comprising at least one first vehicle antenna which is implemented for being mounted on the first vehicle in a predetermined spatial relationship, and for generating a third three-dimensional electromagnetic field, and a first vehicle processing unit connected to the first vehicle antenna unit, which first vehicle processing unit is adapted for defining at least one first vehicle warning zone for the first vehicle, which first vehicle warning zone is a sub-region of the third electromagnetic field, wherein the first vehicle processing unit is adapted by means of the first vehicle antenna unit for detecting whether the control module matched to the first vehicle antenna unit and/or the enabling module matched to the first vehicle antenna unit is present within the first vehicle warning zone, wherein the first vehicle processing unit is implemented for setting a safety status indicator in response to detecting the control module in the first vehicle warning zone, and for deleting the safety status indicator in response to detecting the enabling module in the first vehicle warning zone. The control antenna unit preferably comprises a plurality of control antennas, wherein the first control processing unit is particularly preferably implemented for defining a geometric shape of the control zone. The vehicle antenna unit and/or the enabling antenna unit can also preferably comprise a plurality of antennas. For example, the control zone can be implemented trapezoidal, rectangular, square, triangular, elliptical or round in a vertical projection. The control zone and the enabling zone are preferably disposed adjacent to one another. Furthermore, it should be understood that the logistics safety system can also comprise a plurality of control zones and/or a plurality of enabling zones.

It should be understood that the method according to the first consideration of the invention and the logistics safety system according to the second consideration of the invention comprise the same and similar sub-considerations as are set out particularly in the dependent claims. In this respect, reference is also made in full to the above description of the first consideration of the invention for further embodiments of the logistics safety system and the advantages thereof.

In a first preferred refinement, the vehicle processing unit is implemented for replacing the safety status indicator with a second status indicator in response to the detection of the enabling module in the first vehicle warning zone.

The first vehicle module is preferably implemented for sending a configuration of the first vehicle warning zone to the control module and/or the enabling module when said module is present within range of the first vehicle antenna unit. The control module is preferably implemented for sending the configuration of the control zone to the first vehicle module when it is within range of the control module. Furthermore, the enabling module is preferably implemented for sending the configuration of the enabling zone to the first vehicle module when it is within range of the enabling module. Sending the configurations of the control zone, the vehicle warning zone and/or the enabling zone to a receiving module, can ensure that the receiving module is able to determine whether it is present within the corresponding zone of the sending module, by which a redundancy of the system can be achieved.

In a preferred embodiment, the first vehicle processing unit is implemented for being connected to a control unit of the first vehicle and is implemented for restricting a degree of freedom of movement of the first vehicle when a safety status indicator is set. The first vehicle processing unit can preferably provide a restriction signal to the control unit of the first vehicle to restrict a degree of freedom of movement. Furthermore, the vehicle processing unit can preferably also be implemented for receiving signals from the control unit of the first vehicle. With regard to the definition of the degree of freedom of movement, reference is made to the statements relating to the first consideration of the invention.

According to a preferred refinement, the logistics safety system further comprises a second vehicle module for a second vehicle, comprising a second vehicle antenna unit, comprising at least one second vehicle antenna, which is implemented for being mounted on the second vehicle in a predetermined spatial relationship, and for generating a fourth three-dimensional electromagnetic field, and a second vehicle processing unit connected to the second vehicle antenna unit, which second vehicle processing unit is adapted for defining at least one second vehicle warning zone for the second vehicle, which second vehicle warning zone is a sub-region of the fourth electromagnetic field, wherein the second vehicle processing unit is adapted by means of the second vehicle antenna unit for detecting whether the control module matched to the second vehicle antenna unit and/or the enabling module matched to the vehicle antenna unit is present within the second vehicle warning zone, wherein the second vehicle processing unit is implemented for setting a safety status indicator in response to detecting the control module in the second vehicle warning zone, and for deleting the safety status indicator in response to detecting the enabling module in the second vehicle warning zone. The first vehicle module and the second vehicle module are preferably identical to one another. Likewise preferably, the second vehicle processing unit can be implemented for replacing the safety status indicator with a second status indicator in response to detecting the enabling module in the second vehicle warning zone. The second vehicle antenna unit can also preferably comprise a plurality of antennas.

The first vehicle processing unit is preferably implemented by means of the first vehicle antenna unit for detecting whether the second vehicle module matched to the first vehicle antenna unit is present within the first vehicle warning zone. The first vehicle processing unit preferably detects that a second vehicle module is present within the first vehicle warning zone using a signal provided by the second vehicle module.

In a preferred embodiment, the second vehicle module is implemented for sending a status indicator set in the second vehicle processing unit to the first vehicle module when said module is present within range of the second vehicle antenna unit, preferably within the second vehicle warning zone. However, it can also be provided that the second vehicle module continuously sends the status indicator set in the second vehicle processing unit and/or sends said status indicator at a predetermined clock frequency. Sending the status indicator can ensure that the status indicator set in the second vehicle processing unit is present on the first vehicle processing unit. The first vehicle processing unit is preferably implemented for comparing a status indicator set in the first vehicle processing unit with the status indicator set in the second vehicle processing unit. In an analogous manner, the second vehicle processing unit is preferably also implemented for comparing the status indicators set in the first vehicle processing unit and in the second vehicle processing unit.

The first vehicle module is preferably implemented for determining, based on the received status indicator of the second vehicle module, whether the status indicator of the first vehicle module and the status indicator of the second vehicle module differ from one another. Furthermore, the first vehicle module is preferably implemented for outputting a warning signal when it is determined that the status indicator of the first vehicle module and the status indicator of the second vehicle module differ from one another. It can also be provided that the first vehicle module is implemented for restricting a degree of freedom of movement of the first vehicle when it is determined that the status indicator of the first vehicle module and the status indicator of the second vehicle module differ from one another. The degree of freedom of movement of the first vehicle is therefore preferably only restricted when the status indicators set in the vehicle processing units differ from one another.

In a preferred embodiment, the second vehicle processing unit is implemented by means of the second vehicle antenna unit for detecting whether the first vehicle module matched to the second vehicle antenna unit is present within the second vehicle warning zone. The first vehicle module is preferably implemented for sending a status indicator set in the first vehicle processing unit to the second vehicle module when said module is present within range of the first vehicle antenna unit. The second vehicle module is preferably implemented for determining, based on the received status indicator of the first vehicle module, whether the status indicator of the second vehicle module and the status indicator of the first vehicle module differ from one another. In a preferred embodiment, the second vehicle module is implemented for outputting a warning signal when it is determined that the status indicator of the second vehicle module and the status indicator of the first vehicle module differ from one another. Likewise, the second vehicle module can be implemented for restricting at least one degree of freedom of movement of the second vehicle when it is determined that the status indicator of the second vehicle module and the status indicator of the first vehicle module differ from one another. Both the first vehicle processing unit and the second vehicle processing unit are preferably implemented for performing a comparison of the status indicators.

It should be understood that different degrees of freedom of movement can be restricted from one another for the first vehicle and the second vehicle and/or that identical degrees of freedom of movement can be restricted to different degrees. The first vehicle processing unit and/or the second vehicle processing unit is preferably implemented for restricting the degree of freedom of movement as a function of a vehicle state and/or a predefined vehicle property. For example, for particularly high loads on a lifting unit of a vehicle, which indicate the transport of a particularly high load, acceleration of the vehicle can be restricted to a greater extent than for low loads. Furthermore, a minimum permissible curve radius of a large vehicle can be larger than a corresponding permissible curve radius of a smaller vehicle.

In a preferred refinement, the control module comprises a capturing device, wherein the control processing unit is adapted by means of control antenna unit for detecting whether a first vehicle module and/or a second vehicle module matched to the control antenna unit is present within the first control zone, and wherein the control processing unit is adapted for triggering the capturing device for capturing an image and/or video when it is detected that the first vehicle module and/or the second vehicle module is present within the control zone. However, it can also be provided that the capturing device is mounted on the first vehicle and is triggered by the first vehicle processing unit. The capturing device is preferably implemented as a camera, particularly a digital camera.

The control module is preferably implemented for detecting whether a vehicle module is present within the control zone for the second time within a predefined time period, and to trigger the capturing device only when it is detected that the vehicle module is present within the control zone for the second time within the predefined time period. If the first control zone is disposed at a transition between a loading ramp and a loading area of a transport vehicle, said control zone is typically driven through twice by an industrial truck when the transport vehicle is loaded or unloaded. The vehicle drives over the loading ramp onto the loading area of the transport vehicle and crosses the control zone for the first time, wherein the safety status indicator is set. The vehicle picks up the load on the loading area and then leaves the loading area, crossing the control zone for the second time. An average time period required for said process is known for different types of load and different sizes of transport vehicles, for example, from an economic calculation, tests or based on empirical values, so that said time period can be predefined. If it is detected for the second time within said predefined time period that the vehicle module is present within the control zone, the capturing device is triggered. This is particularly the case when the vehicle, preferably an industrial truck, leaves the loading area with the load. It should be understood that such a function can also be provided in an analogous manner for storage areas or other logistics areas. Providing the predefined time period can guarantee that vehicles that are only crossing the control zone while driving past do not trigger the capturing device. Furthermore, the triggering can also be a control of the capturing device for a predetermined time period and/or up to a predetermined event. The predetermined event can be, for example, the vehicle module leaving the control zone.

The control processing unit is preferably implemented for detecting a load of the first vehicle and/or of the second vehicle using the capturing device. This ensures that potentially dangerous goods are not accidentally transported through the control zone.

In a preferred refinement, the first vehicle module comprises a vehicle capturing device, wherein the first vehicle processing unit is adapted for triggering the vehicle capturing device for capturing an image and/or video. Capturing an image and/or video enables, for example, potentially dangerous cargo to be tracked or hazardous areas in the vehicle's route to be detected. The safety of the logistics safety system can thus be further increased by the vehicle capturing device.

The first vehicle processing unit is preferably adapted by means of first vehicle antenna unit for detecting whether a control module matched to the first vehicle antenna unit is present within the first vehicle warning zone, and for triggering the vehicle capturing device when it is detected that the control module is present within the first vehicle warning zone.

The first vehicle module is preferably implemented for detecting whether a control module is present within the first vehicle warning zone for the second time within a second predefined time period, and for triggering the vehicle capturing device only when it is detected that the control module is present within the first vehicle warning zone for the second time within the second predefined time period.

In a preferred embodiment, the vehicle capturing device can only be triggered when a predetermined status indicator is set. For example, the vehicle capturing device can only be triggered when a vehicle connected to the vehicle module is present in a safety-critical area and the safety status indicator is set. This ensures that the vehicle capturing device is only triggered in potentially dangerous situations. This makes it easier to evaluate the captured images and/or videos, as a result of which information on safety-critical considerations can be more easily detected from the captured images and/or videos. System safety is thus further increased. The predetermined status indicator is preferably the safety status indicator and/or the second status indicator.

In a preferred embodiment, the first vehicle module comprises a load sensor and the first vehicle processing unit is implemented for detecting a change in the load state of the first vehicle using the load sensor and for triggering the vehicle capturing device in response to the determination of a change in the load state of the first vehicle. A change in the load state is preferably picking up and/or setting down a load of the first vehicle. The safety can be further increased by triggering the vehicle capturing device when the load state is changed. For example, using the captured image and/or the captured video, it can be detected whether a dangerous good was correctly set down or picked up. A driver of the first vehicle can then be warned, if necessary.

The vehicle processing unit is preferably implemented for causing the vehicle capturing device to be triggered with a time delay. The triggering can therefore be triggered by the amount of the delay time after the change in the load state has been detected and/or the control module has been detected within the first vehicle warning zone.

The first vehicle processing unit is preferably implemented for detecting a load of the first vehicle using the vehicle capturing device.

In a preferred embodiment, the control module is implemented, using the status indicator of the vehicle module, for detecting whether a vehicle provided with a vehicle module is authorised to drive into the control zone. Furthermore, the control module is preferably implemented for providing a lack of authorisation signal in response to lack of authorisation of the first vehicle to drive in the control zone. However, it can also be provided that the vehicle module is implemented for detecting the authorisation and preferably for providing the lack of authorisation signal. For example, the control module can monitor whether an industrial truck is provided for loading the corresponding transport vehicle. An acoustic signal can be issued when the wrong transport vehicle is approached. This can reduce the risk of accidents between a plurality of vehicles that mistakenly drive to the same transport vehicle.

According to a third consideration, the invention achieves the object indicated above by using a logistics safety system according to the second consideration of the invention to perform the steps of a method according to the first consideration of the invention.

It should be understood that the use according to the third consideration of the invention, the method according to the first consideration of the invention and the logistics safety system according to the second consideration of the invention comprise the same and similar sub-considerations as are set out particularly in the dependent claims. In this respect, for further embodiments of the use and their advantages, reference is also made in full to the above description of the first and second considerations of the invention.

In a fourth consideration, the invention achieves the object indicated above with a computer program comprising commands that cause the logistics safety system according to the second consideration of the invention to execute the method according to the first consideration of the invention when the computer program is executed on a processing unit. It should be understood that the computer program can also be executed in parts on different processing units, particularly the vehicle processing units, the control processing unit and/or an enabling processing unit.

Furthermore, it should be understood that the method for safeguarding a logistics area according to one of the first consideration of the invention, the logistics safety system according to the second consideration of the invention and the computer program product according to the fourth consideration of the invention have the same and similar sub-considerations as are set out particularly in the dependent claims, so that reference is made in full to the above description for the further preferred embodiments of the logistics safety system and the computer program.

BRIEF DESCRIPTION OF THE DRAWINGS

Embodiments of the invention are now be described below with reference to the drawings. Said drawings are not necessarily intended to depict the embodiments to scale; rather, the drawings are shown in schematic and/or slightly distorted form for explanatory purposes. With respect to supplements to the teachings directly discernible from the drawings, reference is made to the applicable prior art. It must be taken into account that various modifications and changes relating to the shape and detail of an embodiment can be made without deviating from the general idea of the invention. The features of the invention disclosed in the description, in the drawings, and in the claims can be essential to the refinement of the invention individually and in any arbitrary combination. In addition, all combinations of at least two of the features disclosed in the description, the drawings and/or the claims fall within the scope of the invention. The general idea of the invention is not limited to the precise form or the detail of the preferred embodiments shown and described below or limited to a subject-matter that would be limited in comparison with the subject-matter claimed in the claims. In the case of the specified measurement ranges, values lying within the stated limits should also be disclosed as limit values and be able to be used and claimed as required. For simplicity, identical reference numerals are used below for identical or similar parts or parts having identical or similar functions. Further advantages, features and details of the invention emerge from the following description of the preferred embodiments and on the basis of the drawings. These show in:

FIG. 1a a schematic plan view of a logistics area having a logistics safety system according to a first embodiment;

FIG. 1b a schematic plan view of the logistics area according to the first embodiment, wherein the first vehicle has a position that has been changed from FIG. 1a;

DETAILED DESCRIPTION

Figure 1B:
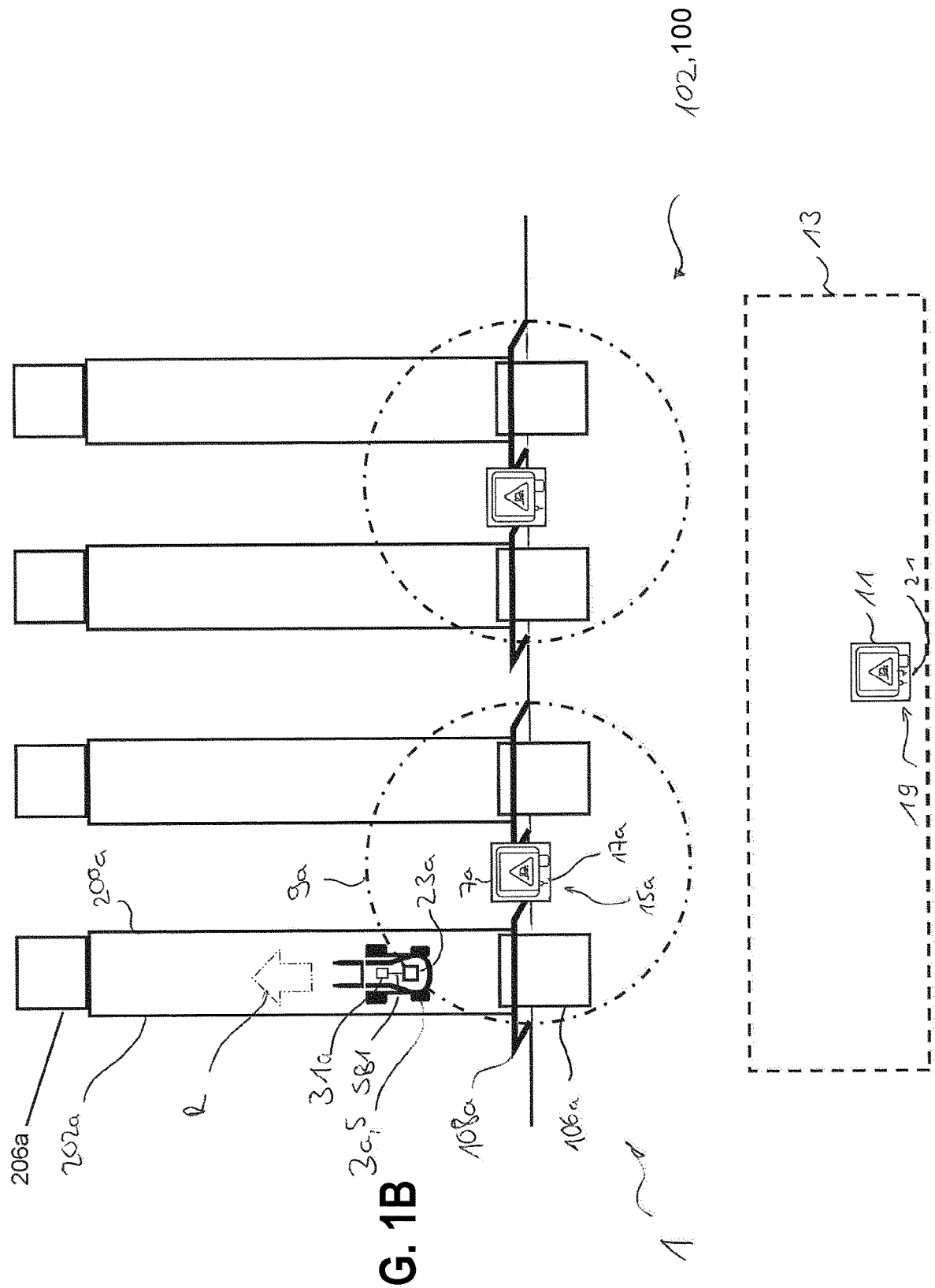

FIG. 1a shows a logistics safety system 1 for safeguarding a logistics area 100 which, according to this embodiment, is a loading zone 102. The loading zone 102 here comprises four parking spaces for transport vehicles 200a, 200b, 200c, 200d, wherein the logistics area 100 is present approximately at the level of the loading areas 200 (e.g., 202a, 202b, 202c, and 202d) of the transport vehicles 200a, 200b, 200c, 200d. The loading zone 102 comprises four loading ramps 106a, 106b, 106c, 106d in order to bridge a gap S between the loading areas 202a, 202b, 202c, 202d of the transport vehicles 200a, 200b, 200c, 200d and the loading zone 102. Said loading ramps 106a, 106b, 106c, 106d can be placed on the loading areas 202a, 202b, 202c, 202d and enable a first vehicle 3a, which here is a forklift 5, to drive onto the loading areas 202a, 202b, 202c, 202d. As the direction of travel R of the first vehicle 3a, indicated by an arrow, makes clear, the first vehicle 3a drives onto the loading area 202a of the first transport vehicle 200a and thereby drives through a gate 108a. The other parking spaces also comprise gates 108a, 108b, 108c, 108d. In order to prevent vehicles 3a from falling, the gates 108a, 108b, 108c, 108d are preferably closed when no transport vehicle 200a, 200b, 200c, 200d is being loaded and/or unloaded.

A first control module 7a of the logistics safety system 1 defines a first control zone 9a. The first control module 7a is disposed here in a fixed relationship between the first gate 108a and the second gate 108b, wherein the first control zone 7a covers the two gates 108a, 108b or transition areas between the loading ramps 106a, 106b, 106c, 106d and the loading areas 200a, 200b, 200c, 200d. It can also be provided that the first control zone 9a only covers the first gate 108a or a transition between the loading ramp 106a and the first loading area 202a.

In an analogous manner, a second control module 7b of the logistics safety system 1 is disposed between the third gate 108c and the fourth gate 108d and defines a second control zone 9b. In this embodiment, the first control zone 9a and the second control zone 9b are implemented circular in a vertical projection. However, provision can also be mad e for the control zones to be implemented square, rectangular, elliptical, trapezoidal, triangular and/or polygonal in a vertical projection. Furthermore, a shape of the first control zone 9a can differ from a shape of the second control zone 9b. All control zones 9a, 9b of the logistics safety system 1 are preferably implemented identically. Furthermore, it should be understood that the logistics safety system 1 can also comprise only one control zone 9a, 9b. For example, the first control zone 9a could cover all gates 108a, 108b, 108c, 108d.

A enabling module 11 is disposed at a distance from the control modules 7a, 7b and defines an enabling zone 13. The enabling zone 13 here is substantially rectangular, wherein said enabling zone can also be circular, elliptical, triangular, square, polygonal or trapezoidal, analogous to the control zones 9a, 9b. Furthermore, it can also be provided that the enabling zone 13 touches the first control zone 9a and/or the second control zone 9b or terminates directly therewith. The first control module 7a comprises a first control antenna unit 15a comprising a first control antenna 17a. In an analogous manner, the second control unit 7b also comprises a second control antenna unit 15b comprising a second control antenna 17b. The control antenna units 15a, 15b of the control modules 7a, 7b preferably comprise a plurality of control antennas 17aa, 17ab, 17ba, 17bb, which are particularly preferably mounted in a fixed spatial relationship to one another. The enabling module 11 also comprises an antenna unit, which is referred to as the enabling antenna unit 19. The enabling antenna unit 19 has two enabling antennas 21 in said embodiment.

The first control module 7a and the second control module 7b are each implemented for generating a three-dimensional electromagnetic field by means of the control antenna unit 15a, 15b (not shown). Furthermore, the control units 7a, 7b are implemented for defining the control zone 9a, 9b, which are a sub-region of the three-dimensional electromagnetic field generated by the respective control unit 7a, 7b. It should be understood that a rang e of the control antennas 17aa, 17ab, 17ba, 17bb and thus also a size of the electromagnetic fields generated is preferably greater than the area covered by the control zone 9a, 9b. The enabling module 11 is also implemented for generating a three-dimensional electromagnetic field by means of the enabling antennas 21 of the enabling antenna unit 19, wherein the enabling module 11 analogously defines the enabling zone 13 as a subregion of said electromagnetic field, not shown.

A first vehicle module 23a, the structure of which will be explained later, is mounted on the vehicle 3a. The vehicle module 23a is matched to the control antenna unit 15a, 15b and the enabling antenna unit 19. For example, the radio frequency ranges of the vehicle module 23a and the control antenna unit 15a, 15b can be matched with one another. If the first vehicle 3a enters the first control zone 9a, the first vehicle module 23a mounted thereon also enters the control zone 9a. Here, both the control module 7a and the first vehicle module 23a are implemented for recognising whether the first vehicle 3a is present in the first control zone 9a. However, it can also be provided that the recognition of whether the first vehicle 3a is present in the first control zone 9a is performed only by the first vehicle module 23a or only by the first control module 7a. In an analogous manner, the second control module 7b is also implemented here for recognising whether the first vehicle module 23a is present in the second control zone 9b.

Figure 2A:
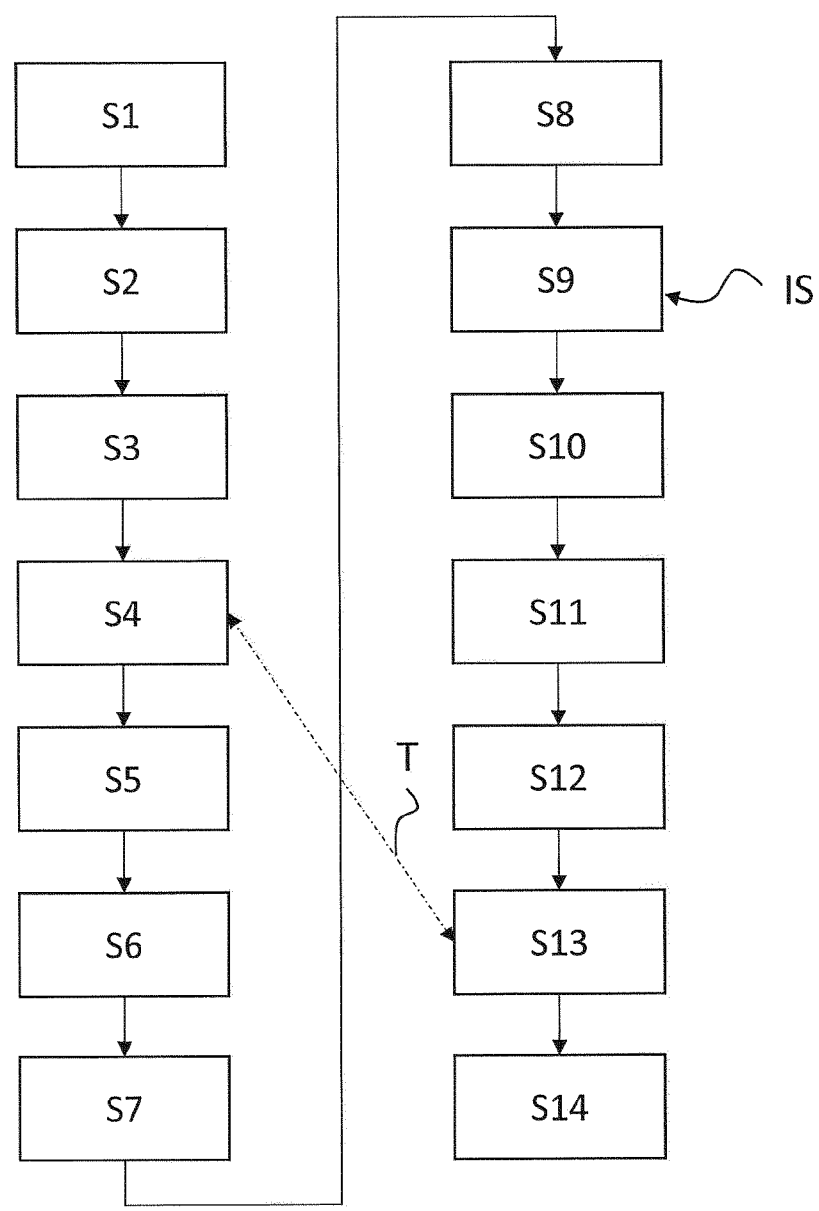
FIG. 2a a schematic representation representing the steps of a first preferred embodiment of the method according to the invention which are performed when the vehicle is moving, as shown in FIGS. 1a to 1d.

Referring to FIG. 2a, steps of a preferred embodiment of the method 2 are explained, which are performed until it is detected whether the first vehicle 3a is present in the first control zone 9a. In a first step S1, the first control module 7a generates and maintains a three-dimensional electromagnetic field by means of the first control antenna unit 15a. In a second step S2, a control processing unit 16a (FIG. 7) of the first control module 7a defines the first control zone 9a which is a sub-region of the three-dimensional electromagnetic field generated by the first control antenna unit 15a. The first control module 7a then monitors the first control zone 9a (step S3). A fifth step S5 by the first control processing unit 16a of the first control module 7a detects when the first vehicle module 23a matched to the control antenna unit 15a enters the first control zone 9a (step S4). In a sixth step S6, the control module 7a sends a configuration KK1 of the first control zone 9a to the first vehicle module 23a using the control antenna unit 15a. The first vehicle module 23a receives said configuration KK1 of the first control zone 9a by means of a first vehicle antenna unit 27a (FIG. 7), which in turn is connected to a first vehicle processing unit 25a (step S7). By means of the received configuration KK1 of the first control zone 9a, the first vehicle processing unit 25a then detects that the first vehicle 3a is present within the first control zone 9a (step S8). In a ninth step S9, the first vehicle processing unit 25a sets a safety status indicator IS in the first vehicle processing unit 25a in response to said determination. In said embodiment, the first vehicle processing unit 25a is connected to a controller 31a (controller 31a is not shown in all figures) of the first vehicle 3a, so that the first vehicle processing unit 25a provides a first restriction signal SB1 to the controller 31a (step S10). If the first restriction signal SB1 is provided to the controller 31a, said controller restricts one or more or all degrees of freedom of movement of the first vehicle 3a (step S11).

The first vehicle module 23a preferably comprises an output unit 51 (FIG. 7) which is implemented for outputting a warning signal when it is detected that the first vehicle 3a is present within the control zone 9a. In said embodiment, a maximum speed of the vehicle 3a is reduced when the restriction signal SB1 is provided. A maximum speed of the first vehicle 3a when driving on the first loading ramp 106a is reduced, as a result of which damage to the first vehicle 3a is prevented. Furthermore, collisions between the first vehicle 3a and the first gate 108a and/or a side wall 204a of the first transport vehicle 200a can be avoided.

According to FIG. 1b, the first vehicle 3a is disposed on the first loading area 202a of the first transport vehicle 200a and leaves the first control zone 9a in the direction of travel R. The vehicle is therefore moving towards a drivers cab 206a of the first vehicle 3a. Based on the configuration KK1 of the first control zone 9a received in step S7, the first vehicle processing unit 25a detects that the first vehicle 3a or the first vehicle module 23a is leaving the first control zone 9a. Even when the first vehicle module 23a leaves the control zone 9a, the safety status indicator IS is retained in the first vehicle processing unit 25a of the first vehicle module 23a. Said embodiment thus also achieves a restriction of a maximum speed of the first vehicle 3a when the vehicle 3a is not present in the first control zone 9a. The first control zone 9a can thus also only cover a sub-region of the first loading area 202a, which advantageously means that an area to be monitored is restricted without reducing the safety effect that can be achieved using the logistics safety system 1.

The first vehicle processing unit 25a of the first vehicle module 23a preferably provides a restriction signal SB1 to the controller 31a of the first vehicle 3a such that a maximum lift height of a lift mast (not shown) of the forklift 5 is restricted. This can prevent a roof (not shown) disposed above the loading area 202a or a tarpaulin (not shown) covering the loading area 202a from being damaged by the lift mast of the forklift 5. Furthermore, a collision between the lift mast and the first gate 108a can be avoided. In FIG. 2a, the retention of the safety status indicator IS in the vehicle processing unit 25a when the first vehicle module 23a leaves the first control zone 9a is represented by step S12.

Figure 1C:
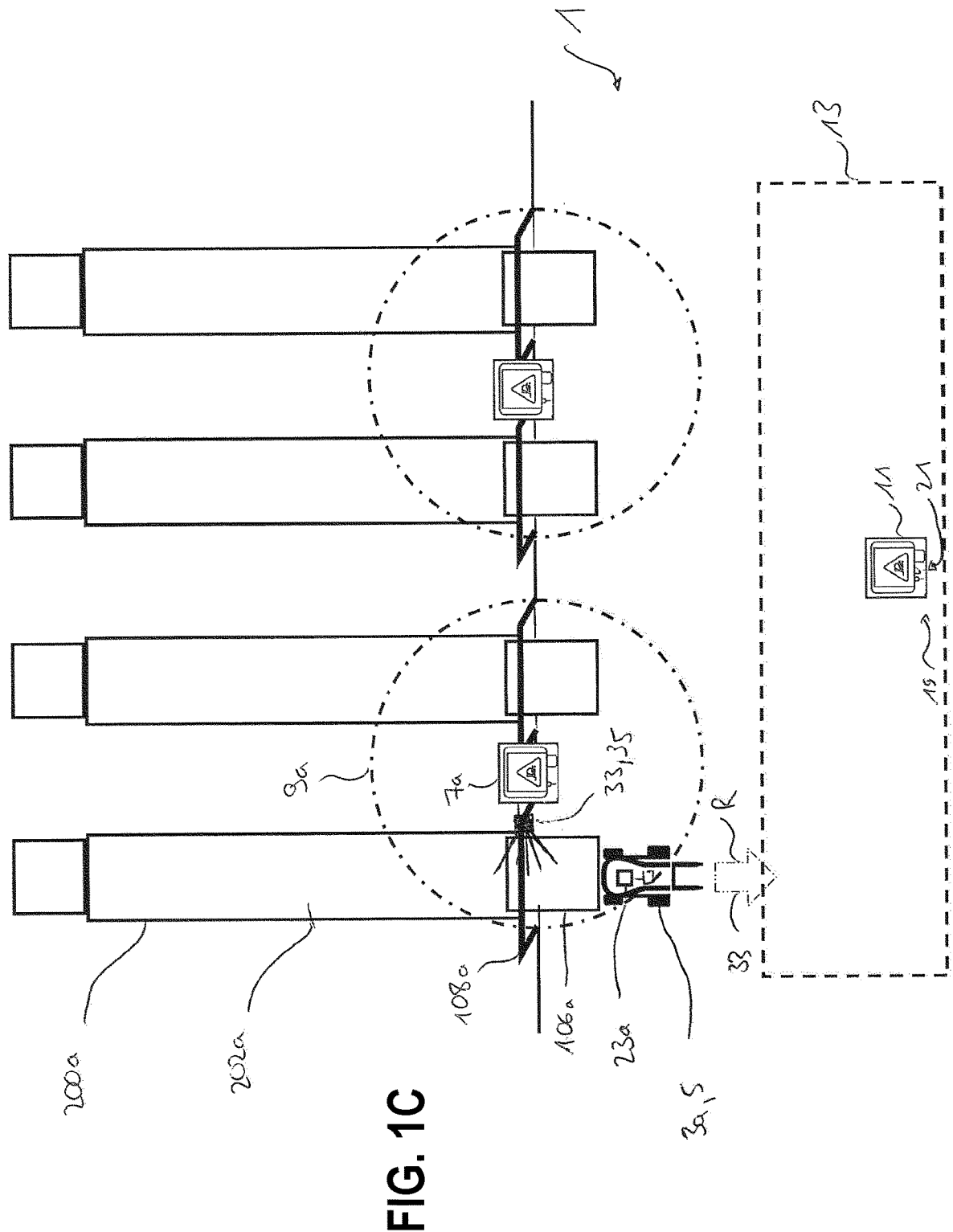
FIG. 1c a schematic plan view of the logistics area according to the first embodiment, wherein the first vehicle has a position that has been changed from FIGS. 1a and 1b.

FIG. 1c illustrates that the safety status indicator IS is also retained in the first vehicle processing unit 25a of the first vehicle module 23a when the first vehicle 3a re-enters the first control zone 9a (step S13). In said embodiment, the first control module 7a is implemented for detecting whether the first vehicle module 23a enters the first control zone 9a for the second time within a predefined time period T. In response to such a determination that the first vehicle module 23a is entering the first control zone 9a for the second time within the predefined time period T (step es 13), the first control module 7a triggers a capturing device 33 connected to the first control module 7a (step S14), which capturing device is implemented here as a camera 35 (only shown in FIG. 1c). If the camera 35 is triggered, it takes a picture of the first vehicle 3a and the load (not shown) transported by said first vehicle 3a. The image can then be used to determine whether the load is damaged during the unloading from the loading area 202a onto the loading zone 102. It can also be provided that the first control module 7a is implemented for triggering the capturing device 33 when the first vehicle module 23a is present in the first control zone 9a for the first time within a predefined time period T. This is particularly desirable when, after logistics processing, it is to be detected whether transport goods were already damaged when they were loaded onto a transport vehicle 200a, 200b, 200c, 200d. Taking into account the predefined time period is then particularly desirable since the first vehicle 3a typically drives through the first control zone 9a several times a day.

Figure 1D:
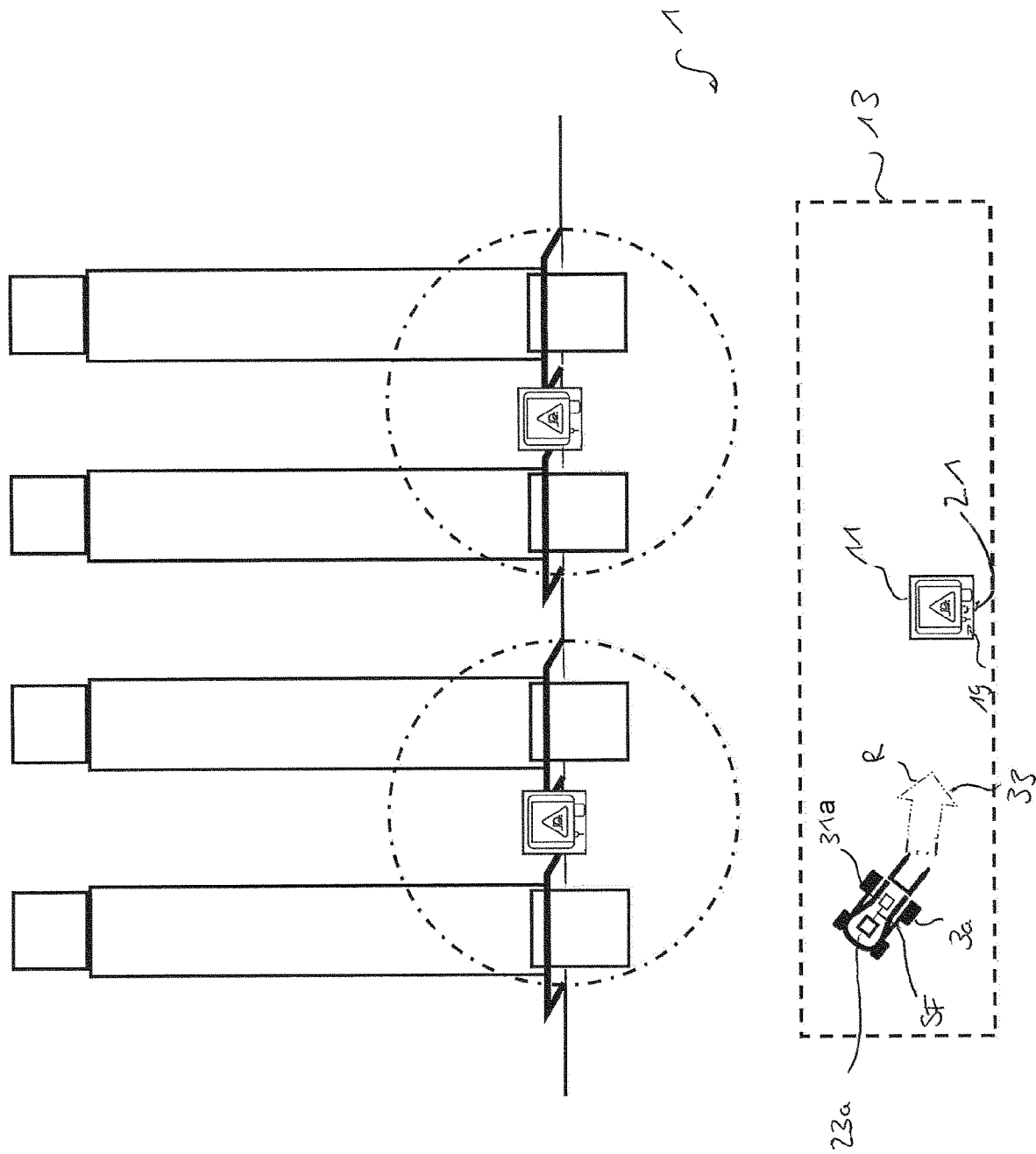
FIG. 1d a schematic plan view of the logistics area according to the first embodiment, wherein the first vehicle is disposed in an enabling zone.
Figure 2B:
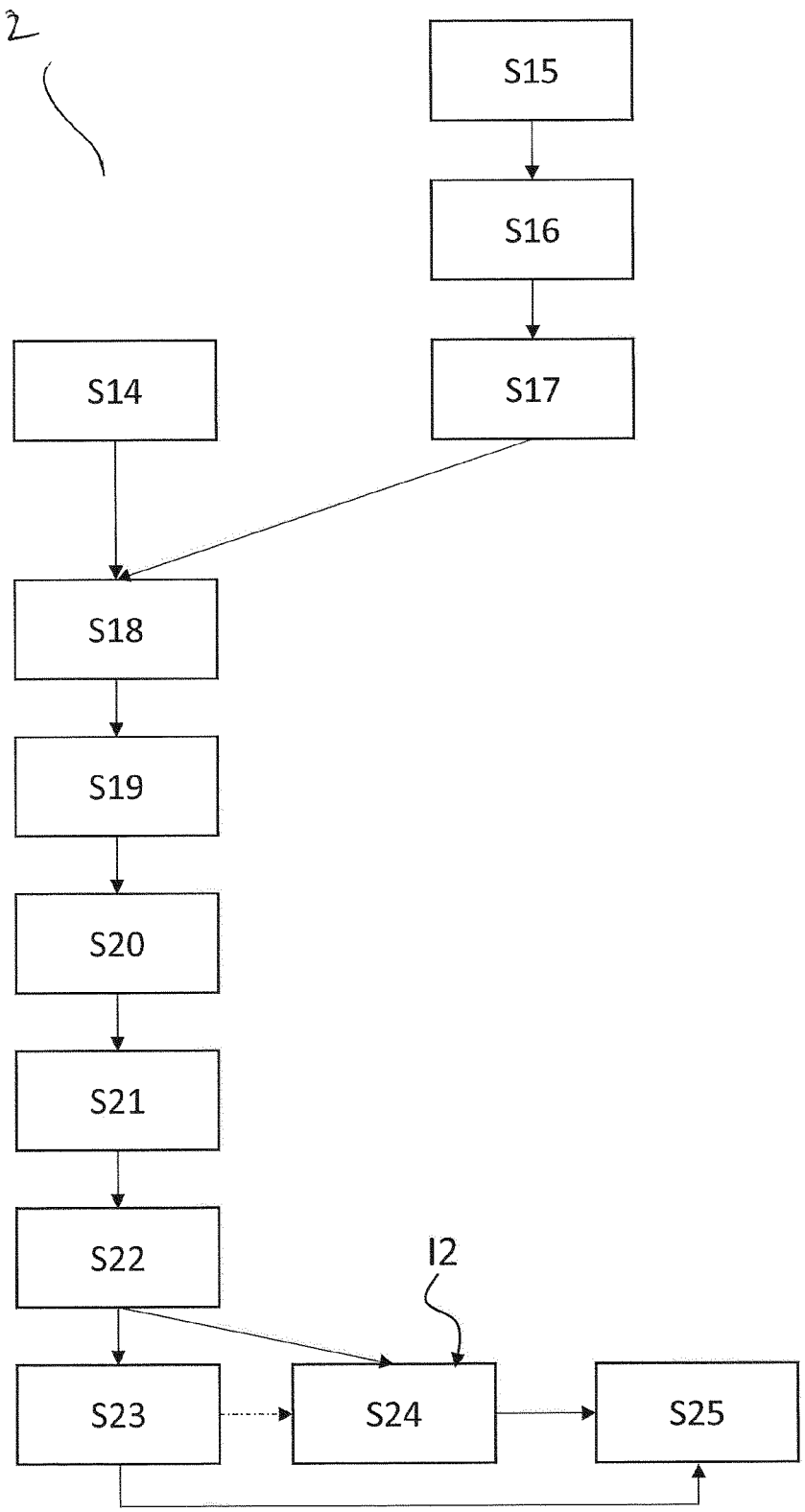
FIG. 2b a schematic representation showing further steps of the first preferred embodiment of the method according to the invention.
Figure 4:
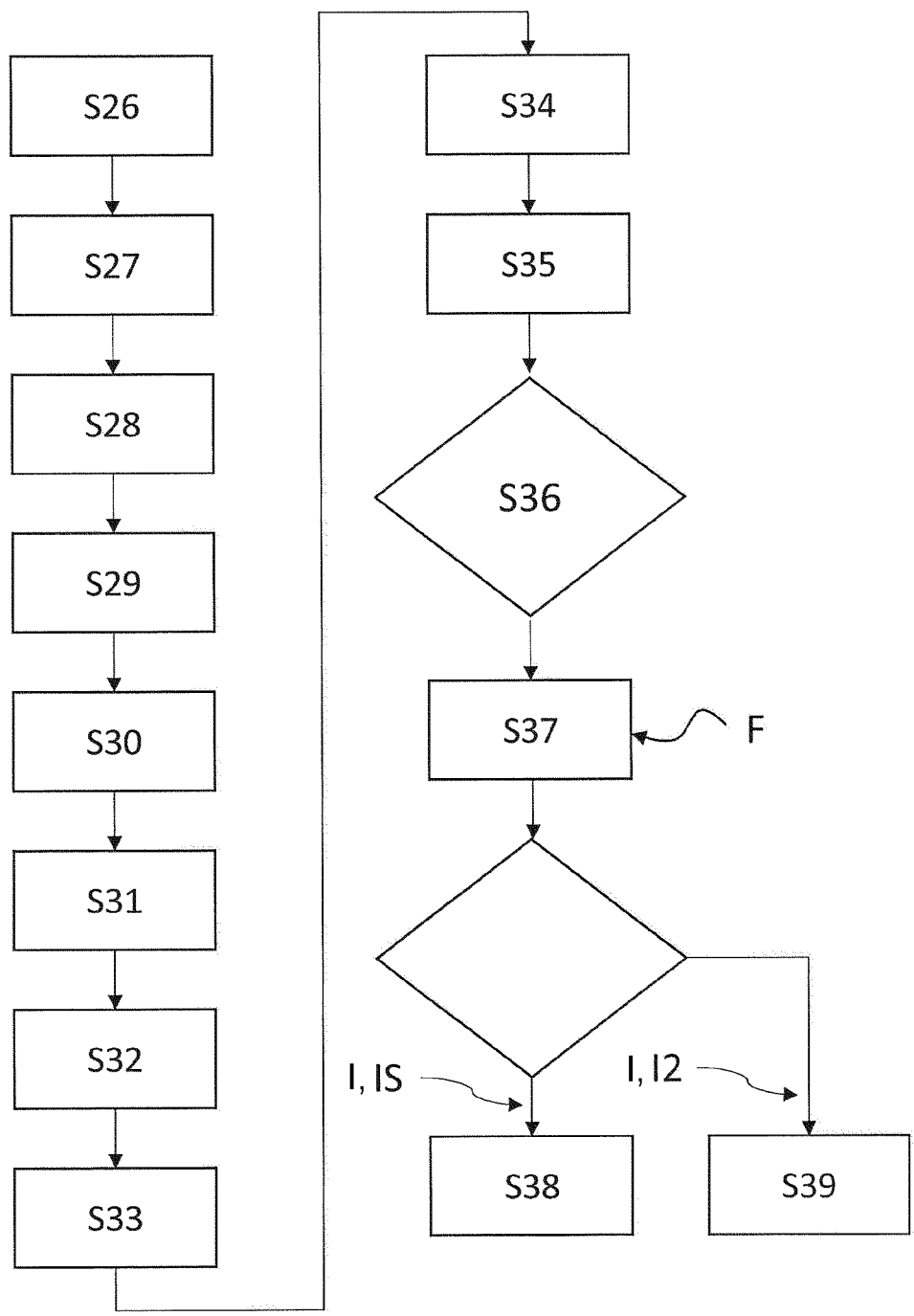
FIG. 4 a schematic representation showing the steps of a second preferred embodiment of the method according to the invention which are performed in the situation shown in FIGS. 3a and 3b.

According to FIG. 1d, the first vehicle 3a has entered the enabling zone 13, which is monitored by the enabling module 11. When it is detected that the first vehicle module 23a is present within the enabling zone 13, the first safety status indicator IS is deleted from the vehicle processing unit 25a. The arrow 33 illustrating the direction of travel R is longer in FIG. 1d than in FIGS. 1a to 1c, thereby representing the now no longer restricted maximum speed of the first vehicle 3a. FIG. 2b illustrates the sequence of the preferred embodiment of the method 2 when the vehicle 3a drives into the enabling zone 11, wherein only step S14 of the preceding steps S11 to S14 is shown in FIG. 4. In a fifteenth step S15, the enabling module 11 generates a three-dimensional electromagnetic field (not shown) by means of the enabling antenna unit 19. A enabling processing unit 35 of the enabling module 11 then defines the enabling zone 13, which is a sub-region of the three-dimensional electromagnetic field generated by the enabling antenna unit 19 (step S16). It should be understood that the enabling zone 13 is preferably smaller than a total range of the enabling antennas 21.

The enabling module 11 monitors the enabling zone 13 in a seventeenth step S17 of the method 2. If the first vehicle 3a on which the first vehicle module 23a is mounted now drives into the enabling zone 13 in an eighteenth step S18, this entry is detected in a nineteenth step S19 by the enabling processing unit 35 of the enabling module 11. In response to the determination that the first vehicle module 23a matched to the enabling processing unit 19 is present in the enabling zone 13, the enabling module 11 sends a configuration of the enabling zone 13 to the first vehicle module 23a (step S20). When the first vehicle module 23a receives the configuration of the enabling zone 13 (step S21), the first vehicle processing unit 25a of the first vehicle module 23a detects that the first vehicle 3a is present in the enabling zone 13 (step S22). The safety status indicator IS is then deleted from the first vehicle processing unit 25a in a twenty-third step S23.

As the branch in FIG. 2b illustrates, alternatively or additionally, in a twenty-fourth step S24, a second status indicator I2 can be set in the first vehicle processing unit 25a when it is detected that the first vehicle module 23a is present within the enabling zone 13. If the safety status indicator IS is deleted or replaced by a second status indicator I2, the first vehicle processing unit 25a provides an enabling signal SF to the controller 31a of the first vehicle 3a (step S25). Preferably, a restriction on the degree of freedom of movement of the vehicle 3a, which here corresponds to a restriction on the maximum speed of the vehicle 3a, is thus lifted. It can, however, be provided that a restriction on the degree of freedom of movement of the first vehicle 3a is only partially lifted and/or that a restriction on a first degree of freedom is lifted while a restriction on a second degree of freedom of movement of the first vehicle 3a is retained. For example, a maximum speed of the vehicle 3a can be increased when the second status indicator I2 is set, wherein a maximum acceleration of the first vehicle 3a remains restricted. A further restriction of the at least one degree of freedom of movement of the vehicle 3a takes place preferably when the second status indicator I2 is set in the first vehicle processing unit 25a. As FIG. 2b shows, steps S15 to S17 are preferably performed in parallel with steps S1 to S14. It should thus be made clear that the enabling zone 13 and the control zone 9a, 9b are preferably monitored simultaneously.

Figure 3A:
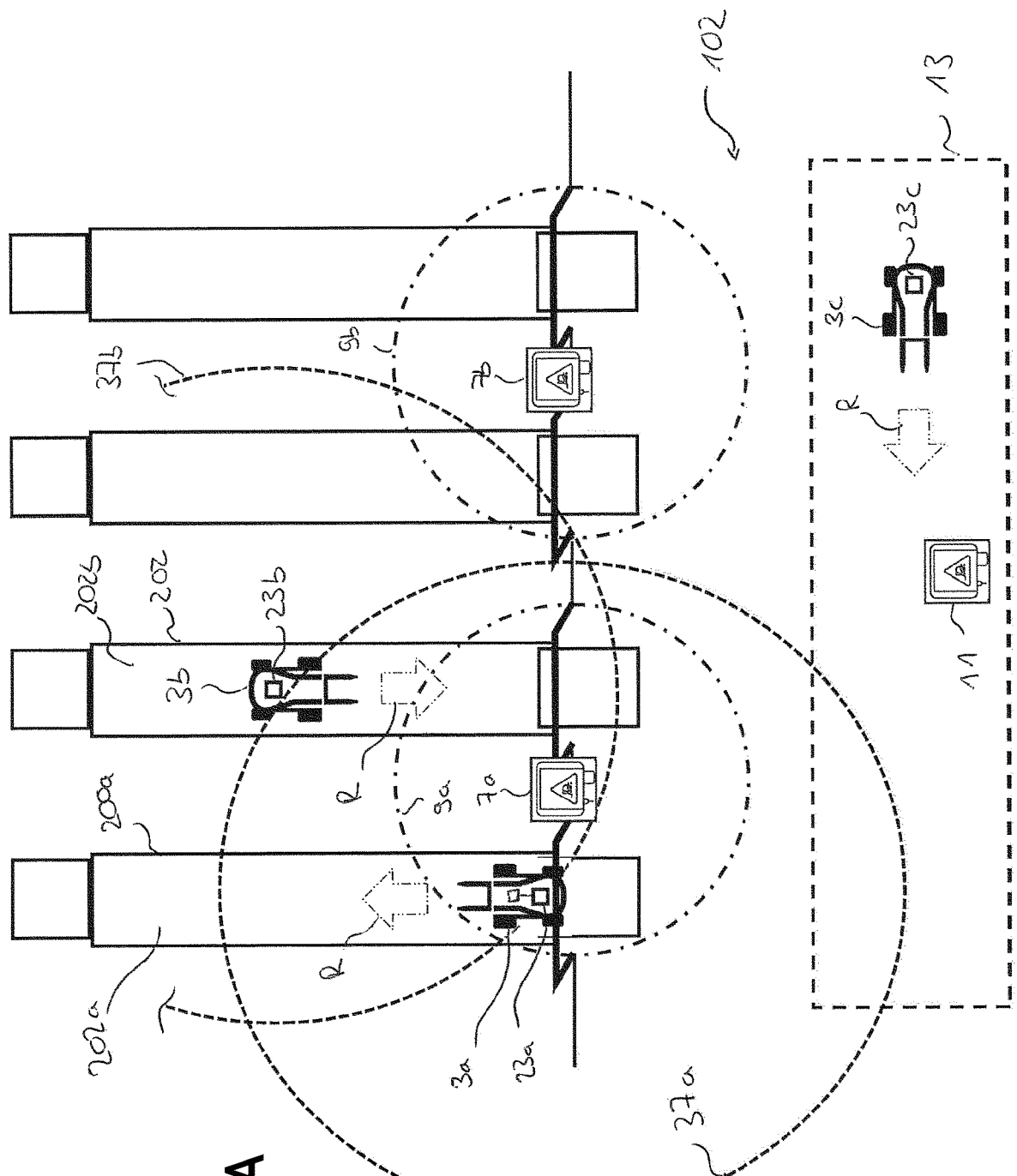
FIG. 3a a schematic plan view of a logistics area having a logistics safety system according to a second embodiment with three vehicles.
Figure 3B:
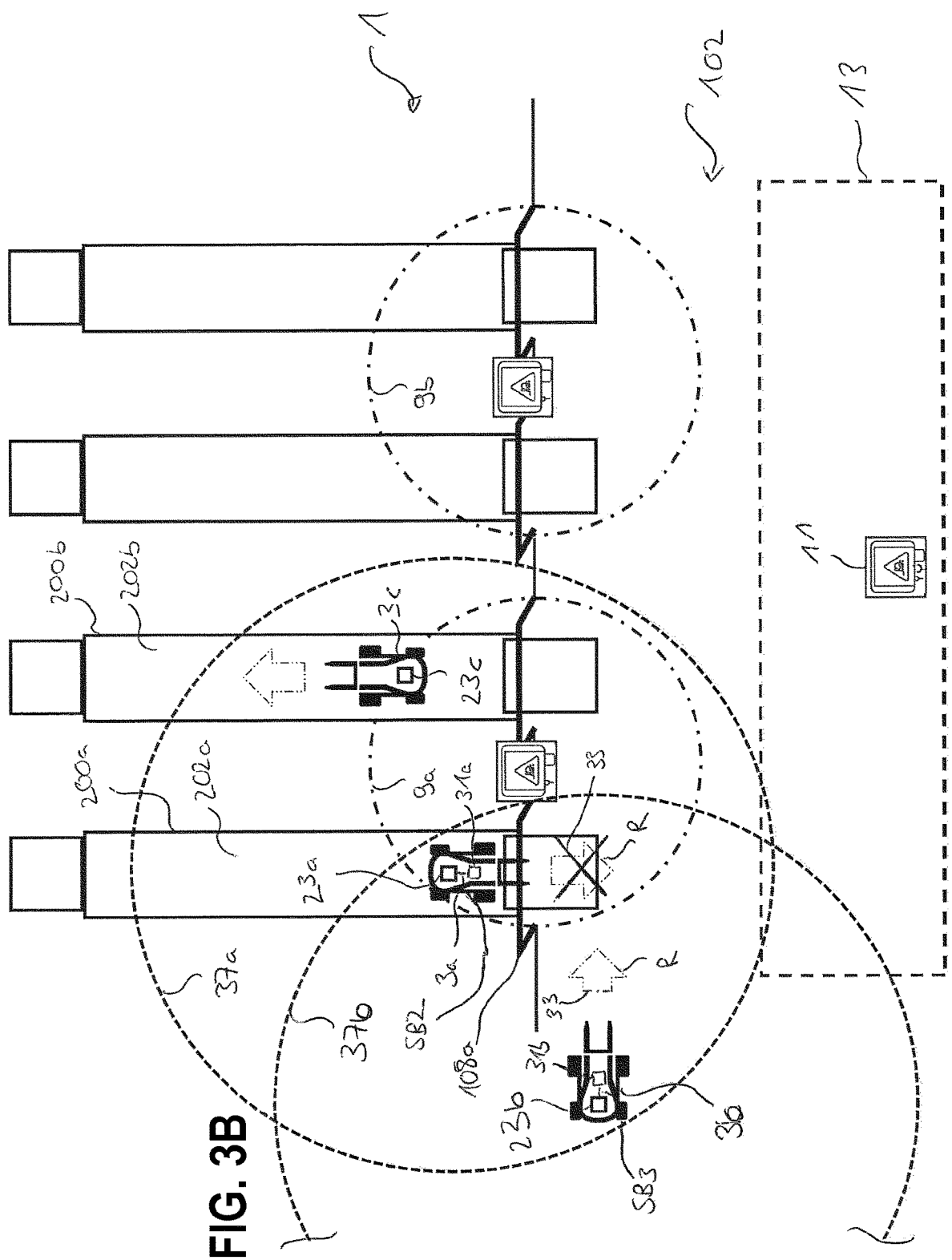
FIG. 3b a schematic plan view of a logistics area having the logistics safety system according to the second embodiment, wherein the vehicles have changed positions.

In a second embodiment, in addition to the first vehicle 3a, a second vehicle 3b and a third vehicle 3c are also shown in the logistics area 100. The disposition of the control modules 7a, 7b, the enabling module 11, the control zones 9a, 9b and the enabling zone 13 in FIGS. 3a, 3b is analogous to the disposition shown in FIGS. 1a to 1d. Analogously to the first vehicle 3a, the second vehicle 3b comprises a second vehicle module 23b and the third vehicle 3c comprises a third vehicle module 23c. The first vehicle module 23a, the second vehicle module 23b and the third vehicle module 23c are preferably implemented identically. The first vehicle module 23a comprises a first vehicle antenna unit 27a which is implemented for generating a three-dimensional electromagnetic field (not shown). The first vehicle processing unit 25a is implemented for defining a first vehicle warning zone 37a which is a sub-region of the three-dimensional electromagnetic field generated by the first vehicle antenna unit 27a. Here, the first vehicle warning zone 37a is implemented circular in a vertical projection.

However, it can also be provided that the first vehicle warning zone is implemented square, rectangular, trapezoidal, triangular, elliptical or polygonal. Furthermore, it can be provided that the first vehicle warning zone 37a comprises a plurality of sub-regions which preferably do not overlap and/or are implemented spaced apart from one another. For example, a first sub-region of the first vehicle warning zone 37a can extend in the direction of travel R from the first vehicle 3a, and a second sub-region of the first vehicle warning zone 37a can extend counter to the direction of travel R from a rear 39 of the first vehicle 3a. The second sub-region is preferably smaller than the first sub-region. It should be understood that the second vehicle module 23b and the third vehicle module 23c are also implemented for generating second and third vehicle warning zones, wherein the second vehicle warning zone 37b is only shown in some of the figures and the third vehicle warning zone is not shown for reasons of illustration. The second vehicle module 23b mounted on the second vehicle 3b is just entering the first vehicle warning zone 37a in FIG. 3a.

FIG. 4 illustrates steps of a preferred embodiment of the method 2, which are preferably performed consecutively or in parallel with steps S1 to S25 described above. In a twenty-sixth step S26, the first vehicle module 23a generates a three-dimensional electromagnetic field by means of the first vehicle antenna unit 27a, wherein the first vehicle processing unit 25a then defines the first vehicle warning zone 37a. The first vehicle warning zone 37a is a sub-region of the three-dimensional electromagnetic field generated by the first vehicle antenna unit 27a (step S27). The first vehicle processing unit 25a then monitors the first vehicle warning zone 37a (step S28). If the second vehicle module 23b matched to the first vehicle antenna unit 27 enters the first vehicle warning zone 37a (step S29), this entry is detected by the first vehicle processing unit 25a (step S30). In response to the determination, the first vehicle module 23a sends the configuration KW1 of the first vehicle warning zone 37a to the second vehicle module 23b using the first vehicle antenna unit 27a (step S31).

The second vehicle module 23b receives, by means of a second vehicle processing unit 25b, the configuration KW1 of the first vehicle warning zone 37a sent by the first vehicle module 23a (step S32) and detects that the second vehicle module 23b is present within the first vehicle warning zone 37a (step S33). If it is detected that the second vehicle module 23b is present within the first vehicle warning zone 37a, the second vehicle module 23b sends a status indicator I set in the second vehicle processing unit 25b of the second vehicle module 23b to the first vehicle module 23a (step S S34). The first vehicle module 23a receives the status indicator I set in the second vehicle processing unit 25b of the second vehicle module 23b by means of the first vehicle antenna unit 27a (step S35) and, in a thirty-sixth step S36, compares the status indicators I that are set in the first vehicle processing unit 25a and the second vehicle processing unit 25b by means of the first vehicle processing unit 25a. It should be understood that the second vehicle module 23b can also define a second vehicle warning zone 37b and preferably executes steps S26 to S36 of method 2 simultaneously with the first vehicle module 23a.

As FIG. 3a shows, the first vehicle 3a drives onto the first loading area 202a of the first transport vehicle 200a and thereby crosses the first control zone 9a, so that the safety status indicator IS is set in the first vehicle processing unit 25a. The second vehicle 3b is present on the loading area 202b of the second transport vehicle 200b and has crossed the first control zone 9a for this purpose. The safety status indicator IS was also set in the second vehicle processing unit 25b of the second vehicle module 23b during said crossing. Furthermore, the safety status indicator IS was retained in the second vehicle processing unit 25b when the second vehicle 3b left the first control zone 9a. The safety status indicator IS is therefore set both in the first vehicle processing unit 25a and in the second vehicle processing unit 25b.

In the situation shown in FIG. 3a, the comparison of the status indicators (step S36) accordingly shows that the status indicator IS set in the first vehicle processing unit 25a matches the status indicator IS set in the second vehicle processing unit 25b, wherein no follow-on operation F in said embodiment is performed when the status indicators I of the first vehicle processing unit 25a and the second vehicle processing unit 25b match.

The third vehicle module 23c is not disposed within the first vehicle warning zone 7a or the second vehicle warning zone 7a, so that no further steps take place here and the monitoring (step S28) is continued.

FIG. 3b shows a disposition of the first, second and third vehicles 3a, 3b, 3c in the logistics area 100 which is different from FIG. 3a. The first vehicle 3a is furthermore disposed on the first loading area 202a of the first transport vehicle 200a. The third vehicle 3c is disposed on the second loading area 202b of the second transport vehicle 200b and the second vehicle 3b is now neither present in one of the control zones 9a, 9b nor in the enabling zone 13. The second vehicle warning zone 37b is only partially shown in FIG. 3b and a vehicle warning zone generated by the third vehicle module 23c is not shown.

According to said embodiment, no status indicator I is set in the second vehicle processing unit 25b of the second vehicle module 23b. The first vehicle module 23a is present in the second vehicle warning zone 37b, which is defined by the second vehicle processing unit 25b of the second vehicle module 23b. In an analogous manner, the second vehicle module 23b is present in the first vehicle warning zone 37a of the first vehicle module 23a. As the arrows 33 show, which illustrate the direction of travel R of the vehicles 3a, 3b, 3c, the first vehicle 3a and the second vehicle 3b move towards one another, wherein a direct visual contact between the first vehicle 3a and the second vehicle 3b through the first gate 108a is prevented. There is thus the risk of a collision between the first and the second vehicle 3a, 3b, which can be prevented by means of the logistics safety system 1.

FIG. 4 illustrates method steps of a preferred embodiment of method 2, which are performed in the situation shown in FIG. 3b and preferably in parallel with the remaining steps S1 to S36. First, the second vehicle module 23b mounted on the second vehicle 3b enters the first vehicle warning zone 37a (step S29). The first vehicle module 23a detects this (step S30) and then sends the configuration KW1 of the first vehicle warning zone 37a (step 31) to the second vehicle module 23b. The configuration KW1 of the first vehicle warning zone 37a is received at the second vehicle module 23b (step S32) and, in response to this, the second vehicle module 23b detects that it is present within the first vehicle warning zone 37a (step S33). The second vehicle module 23b then sends the status indicator I set in the second vehicle processing unit 25b to the first vehicle module 23a (step S34). It should be understood that step S34 can also be the sending of information which includes that no status indicator I is set in the second vehicle processing unit 25b.

In contrast to the situation illustrated in FIG. 3a, the second vehicle 3b is not present on one of the loading areas 202a, 202b, 202c, 202d of the transport vehicles 200a, 200b, 200c, 200d. Since the second vehicle 3b was previously present in the enabling zone 13, no status indicator I is stored in the second vehicle processing unit 25b. The safety status indicator IS is set in the first vehicle processing unit 25a, since the first vehicle 3a is present in the control zone 9a. The comparison of the status indicators I performed in step S36 therefore shows that the status indicators I set in the first vehicle processing unit 25a and the second vehicle processing unit 25b differ.

In response to the determination by the first vehicle processing unit 25a that the status indicators I do not match, the first vehicle processing unit 25a performs a follow-up operation F (step S37). In said embodiment, the first vehicle processing unit 25a provides a second restriction signal SB2 as a follow-on operation 11. In a thirty-eighth step S38, the controller 31a of the first vehicle 3a restricts a degree of freedom of movement of the first vehicle 3a, wherein the first vehicle 3a is braked here to a stop. The complete braking is illustrated by the crossing through of the arrow 33, inserted in FIG. 3b, representing the direction of travel R of the first vehicle 3a.

The follow-on operation is preferably performed taking into account the status indicator I set in the vehicle processing unit 25a. For example, a second restriction signal SB2 can be provided when the safety status indicator SI is set and a third restriction signal SB3 is provided when the second status indicator I2 or no status indicator is set (step S39). In said embodiment, the first vehicle 3a is thus fully braked by providing the second restriction signal SB2 (step S38), while the second vehicle 3b is restricted only in the maximum speed thereof by a provision of the third restriction signal SB3 by the second vehicle processing unit 25b (step S38; made clear by shortening the arrow 33).

The follow-on operation 11 can preferably also comprise the outputting of a warning signal by means of the output unit 51a, 51b of the vehicle module 23a, 23b, 23c. For example, the vehicle modules 23a, 23b, 23c can comprise optical and/or acoustic output units 51a, 51b, such as signal lights, sirens and/or screens.

Figure 5A:
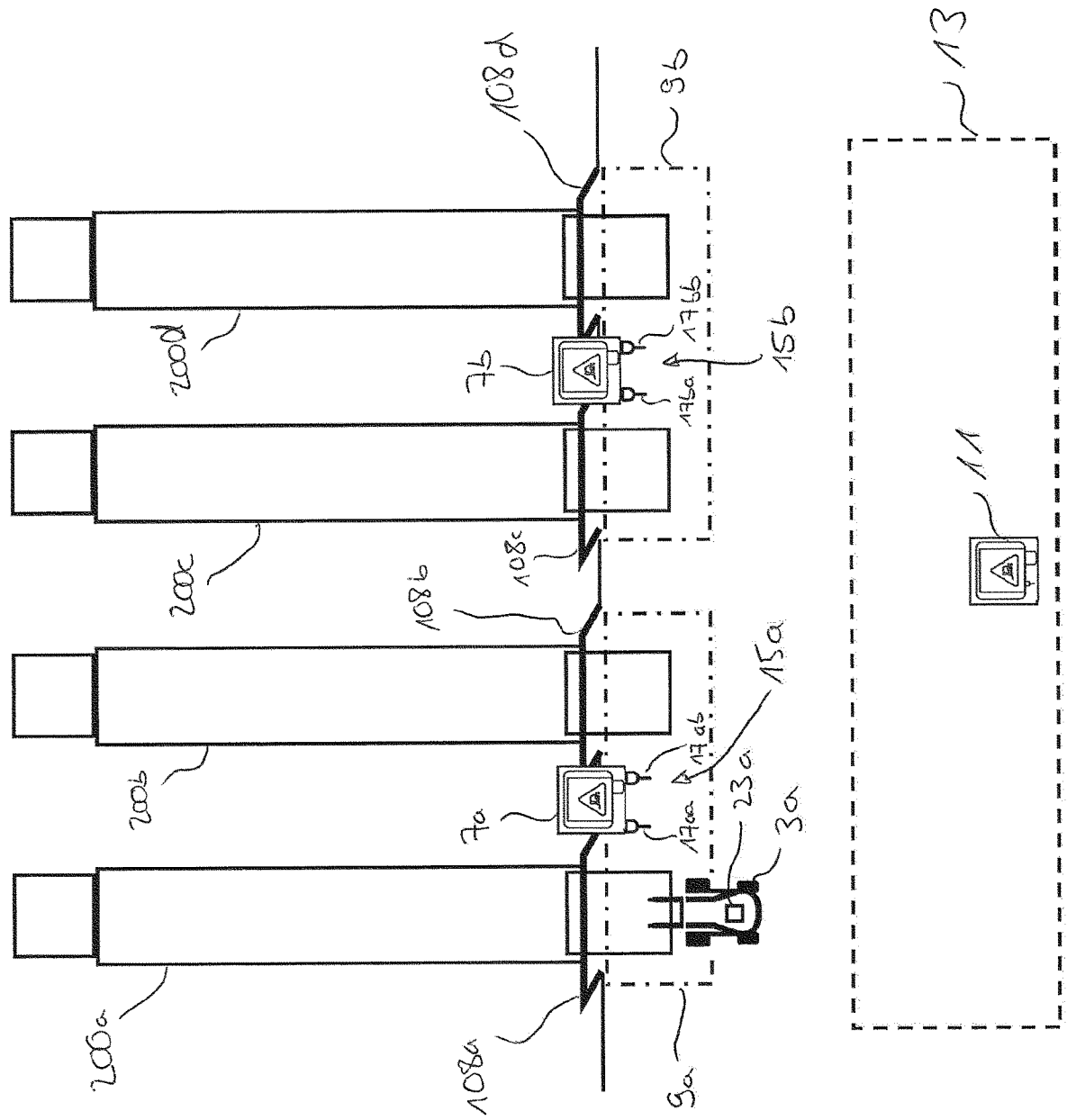
FIG. 5a a schematic plan view of a logistics area having a logistics safety system according to a third embodiment, wherein the control zones are defined differently than in the first embodiment.

FIG. 5a illustrates a logistics safety system 1 according to a third embodiment, wherein the first control zone 9a and the second control zone 9b are implemented rectangular in a perpendicular projection and are substantially disposed on the opposite sides of the gates 108a, 108b, 108c, 108d on the transport vehicles 200a, 200b, 200c, 200d. To define the control zones 9a, 9b, the control antenna units 15a, 15b each comprise two control antennas 17aa, 17ab, 17ba, 17bb. A rectangularly shaped control zone 9a, 9b can be monitored due to the presence of a plurality of control antennas 17aa, 17ab, 17ba, 17bb. The principle of triangulation is preferably used when defining the control zone 9a, 9b by the control processing units 16a, 16b.

The control modules 7a, 7b are preferably implemented for being connected to gate controllers 39c, 39d. In the fourth embodiment shown in FIG. 5a, the second control module 7b is connected to a third gate controller 39c of the third gate 108c and a fourth gate controller 39d of a fourth gate 108d. The gate controllers 39c, 39d provide third and fourth closing signals SS3, SS4. It should be understood that the first control module 7a can also be connected to gate controllers 39c, 39d. The control modules 7a, 7b are preferably implemented for defining the control zones 9a, 9b using an open state of a transition 41c, 41d to be monitored.

Figure 5B:
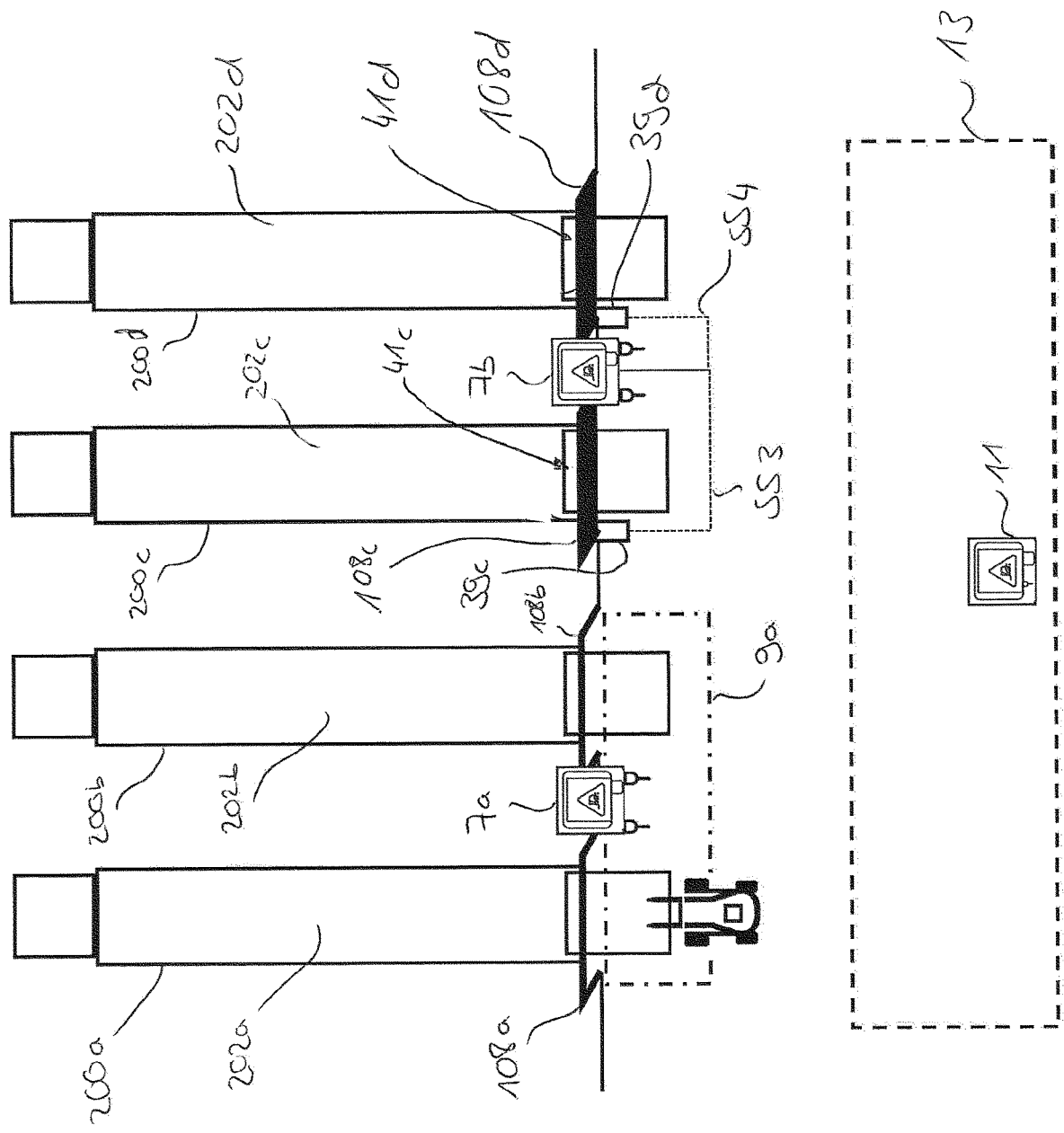
FIG. 5b a schematic plan view of a logistics area having a logistics safety system according to the third embodiment, wherein two gates of the logistics area are closed.

The third gate 108c and the fourth gate 108b are closed according to FIG. 5b, wherein the first gate controller 39c and the second gate controller 39d provide open state signals which here correspond to the closing signals SS3, SS4. Since the third gate 108c and the fourth gate 108d are closed, there is no risk of vehicles 3a, 3b, 3b falling from the loading zone 102. Therefore, transitions 41c, 41d to the loading areas 202c, 202d do not have to be monitored, and the second control unit 7b subsequently does not define a second control zone 9b. It should be understood that the control modules 7a, 7b according to the further embodiments can also be connected to gate controllers of respectively assigned gates 108a, 108b, 108c, 108d.

Figure 6:
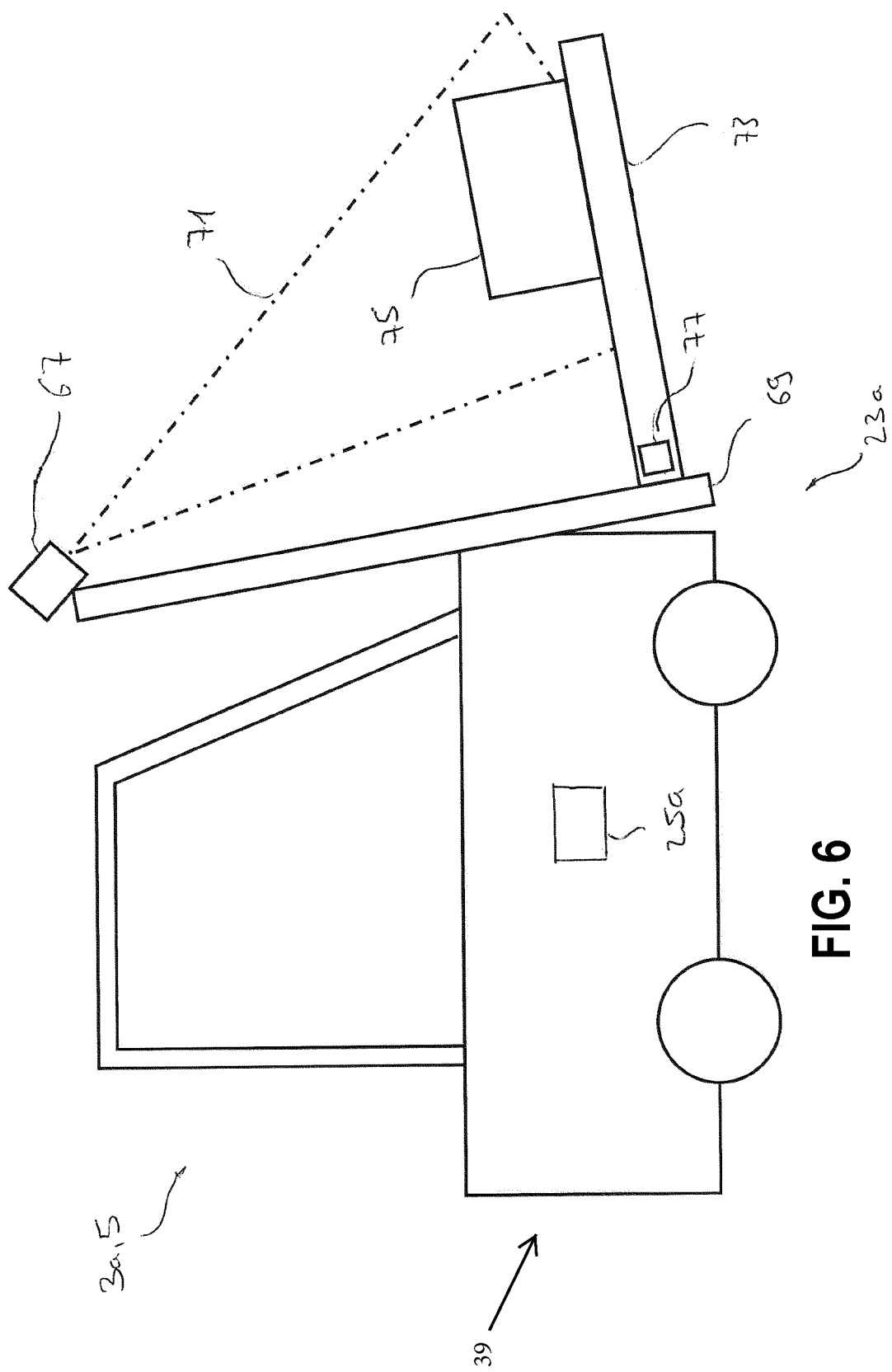
FIG. 6 a schematic representation of a first vehicle transporting a load.

FIG. 6 shows a first vehicle 3a, which here is a forklift 5. The first vehicle module 23a comprises a vehicle capturing device 67, which here is disposed on a lift mast 69 of the forklift 5. A capturing area 71 of the vehicle capturing device 67 is directed towards loading prongs 73 of the forklift 5, so that a load 75 transported by the first vehicle 3a can be captured by the vehicle capturing device 67 when it is triggered by the first vehicle processing unit 25a.

The first vehicle module 23a also comprises a load sensor 77. The first vehicle processing unit 25a is connected to the load sensor 77 and is implemented for detecting a load state of the first vehicle 3a using the load sensor 77. The vehicle processing unit 25a and the load sensor 77 are wirelessly connected in said embodiment. The vehicle processing unit 25a and the load sensor 77 are preferably connected by means of infrared, ultrasound, Bluetooth® and/or radio. Signals, data and/or electrical energy can then be transmitted between the load sensor 77 and the first vehicle processing unit 25a, for example, via infrared, ultrasound, radio or Bluetooth. The vehicle capturing device 67 and the first vehicle processing unit 25a are preferably also connected wirelessly.

The first vehicle processing unit 25a can determine whether a load state of the vehicle 3a is changing using the load sensor 77. For example, the picking up or setting down of the load 75 can be registered by the first vehicle processing unit 25a. The first vehicle processing unit 25a is preferably implemented for triggering the vehicle capturing device 67 in response to a change in the load state. If, for example, the load 75 is set down, the vehicle capturing device 67 can record an image of the load 75 at the time of the setting down. The image can then preferably be used for registering damage to the load 75.

Safety can thus be increased, particularly in the case of dangerous goods. Furthermore, the vehicle processing unit 25a can only be triggered when a predetermined status indicator I, particularly preferably the safety status indicator IS, is set. Thus, it is often only necessary to capture the load 75 in areas that are difficult to see or particularly critical areas, and said restriction can effectively reduce processing effort. For example, it may be necessary to trigger the vehicle capturing device 67 or to take a picture of the load 75 only when the first vehicle 3a sets down a dangerous load 75 on the loading area 202a.

Figure 7:
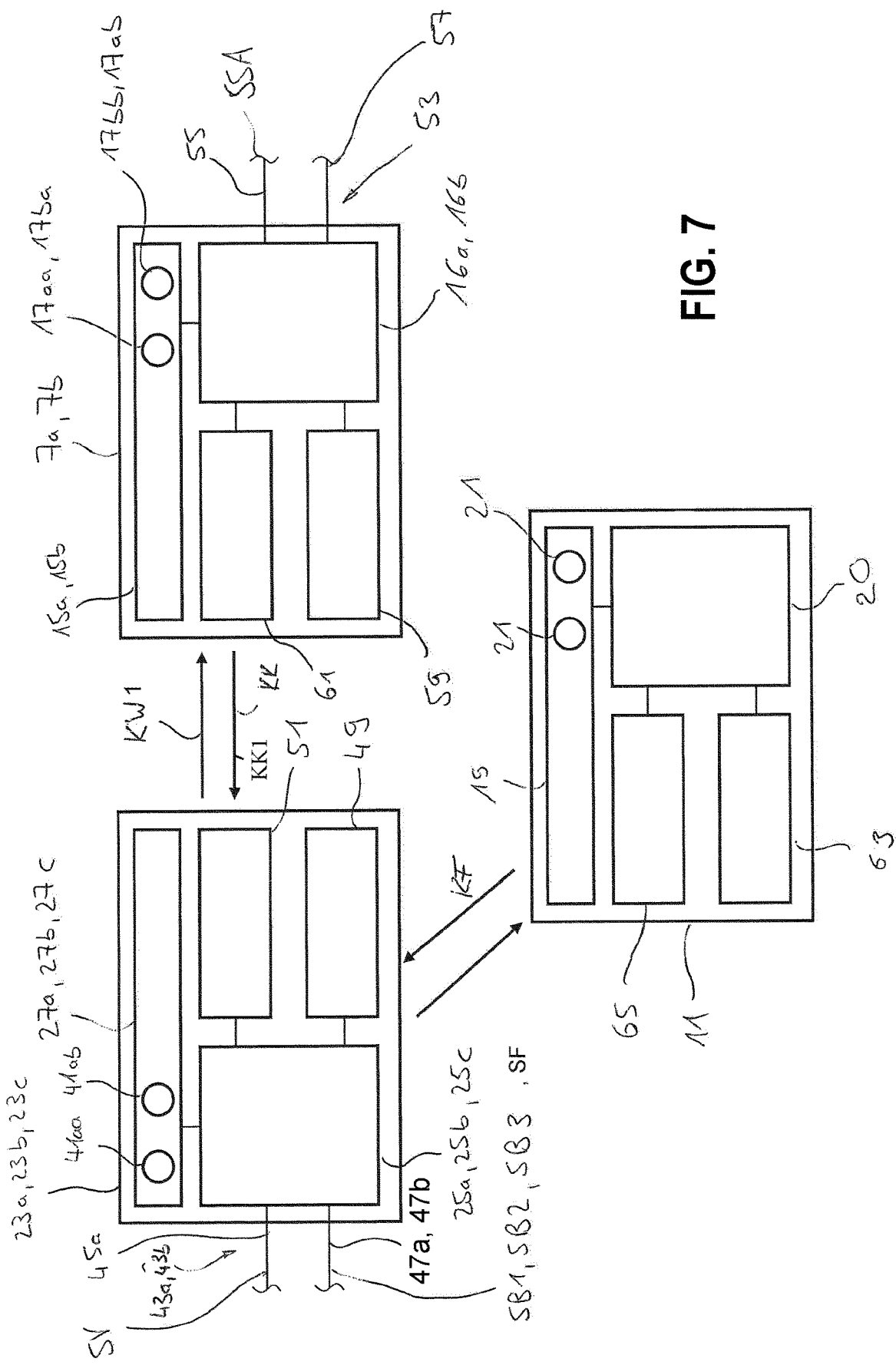
FIG. 7 in a schematic manner, the structure of a vehicle module, a control module and an enabling module; and in FIG. 8 in a schematic manner, the communication between a first vehicle module and a second vehicle module.

FIG. 7 schematically shows the structure of a vehicle module 23a, 23b, 23c, a control module 7a, 7b and an enabling module 11. The vehicle module 23a, 23b, 23c comprises a vehicle antenna unit 27a, 27b, 27c, which is shown here comprising a first vehicle antenna 41aa and a second vehicle antenna 41ab. The vehicle processing unit 25a, 25b, 25c is connected to the vehicle antenna unit 27a, 27b, 27c and furthermore comprises a vehicle interface 43a, 43b. The vehicle interface 43a, 43b is shown here comprising a first line 45a, 45b and a second line 47a, 47b, wherein the first line 45a, 45b is implemented for receiving signals, such as speed signals SV, of the vehicle 3a, 3b, 3c. The second line 47a, 47b is provided for outputting signals from the vehicle module 23a, 23b, 23c to the vehicle 3a, 3b, 3c. Thus, the restriction signals SB1, SB2, SB3 and the enabling signal SF can be provided to the controller 31a, 31b of the vehicle 3a, 3b, 3c by means of the second line 47a, 47b. The vehicle module 23a, 23b, 23c also comprises a memory 49 in which, for example, configurations for the vehicle warning zone 37a, 37b can be prestored. Furthermore, the vehicle module 23a, 23b, 23c comprises an output unit 51a, 51b which can output, for example, optical and/or acoustic signals for warning a driver of the vehicle 3a, 3b, 3c.

In an analogous manner, the control module 7a, 7b comprises the control antenna unit 15a, 15b comprising the control antennas 17aa, 17ab, 17ba, 17bb. The control processing unit 16a, 16b is connected to the control antenna unit 15a, 15b and comprises a control interface 53 for connection to a gate controller 39c, 39d. The control processing unit 16a, 16b can provide signals, such as closing request signals SSA, to the gate controller 39c, 39d by means of a first line 55. The gate controller 39c, 39d is preferably implemented for closing the gate 108c, 108d in response to the provision of a closing request signal SSA. A second line 57 of the control interface 53 is implemented for receiving the closing signals SS3, SS4. The control module 7a, 7b further comprises a control memory 59 and a control output unit 61. The arrows running between the control unit 15a, 15b and the vehicle module 23a, 23b, 23c represent the sending of the configuration KK of the control zone 9a, 9b and the configuration KW1, KW2 of the vehicle goods zones.

Finally, FIG. 7 shows the enabling module 11 comprising the enabling antenna unit 19, the enabling antennas 21 and an enabling processing unit 20. Analogous to the control module 7a, 7b and the vehicle module 23a, 23b, 23c, the enabling module 11 also comprises an enabling memory 63 and an enabling output unit 65. The arrows running between the enabling module 11 and the vehicle module 23a, 23b, 23c represent the sending of the configuration KF of the enabling zone 13 from the enabling module 11 to the vehicle module 23a, 23b, 23c and a possible sending of the configuration KW1 of the vehicle warning zone 37a, 37b from the vehicle module 23a, 23b, 23c to the enabling module 11.

FIG. 8 now illustrates the communication between the first vehicle module 23a and the second vehicle module 23b. The vehicle modules 23a, 23b are implemented identically here and each comprise a vehicle antenna unit 27a, 27b, two vehicle antennas 41aa, 41ab, 41ba, 41bb, a vehicle processing unit 25a, 25b, a memory 49a, 49b, an interface 43a, 43b and an output unit 51a, 51b. The first vehicle module 23a is implemented, by means of the first vehicle antenna unit 27a, for sending a configuration KW1 of the first vehicle warning zone 37a and/or the status indicator I set in the first vehicle processing unit 25a to the second vehicle module 23b. In an analogous manner, the second vehicle module 23b is implemented for sending a configuration KW2 of the second vehicle warning zone 37b and/or a status indicator I set in the second vehicle processing unit 25b.

The invention claimed is:

1. A method for securing a logistics area having a loading zone, comprising the steps:
monitoring, by a control module, only a control zone which is part of the loading zone and which is a sub-region of a first three-dimensional electromagnetic field provided by a control antenna unit;
detecting, by one of the control module or a first vehicle module, whether the first vehicle module is present in the control zone, wherein the first vehicle module is mounted on a first vehicle and is matched to the control antenna unit;
setting, by the first vehicle module, a safety status indicator in a first vehicle processor of the first vehicle module, in response to detecting the first vehicle module in the control zone;
restricting, by the first vehicle module, at least one degree of freedom of movement of the first vehicle when the safety status indicator is set in the first vehicle processor;
monitoring, by an enabling module, only an enabling zone which is part of the loading zone;
detecting, by one of the first vehicle module or the enabling module, whether the first vehicle module is present in the enabling zone,
deleting, by the first vehicle module, the first safety status indicator when it is detected that the first vehicle module is present in the enabling zone, and
maintaining the safety status indicator, and therefore the restriction on the at least one degree of movement of the first vehicle, when the first vehicle is in an area of the loading zone that is outside of the control zone and outside of the enabling zone,
wherein the safety status indicator is maintained in the first vehicle processor even when the first vehicle module leaves the control zone and until the first vehicle module is detected in the enabling zone.

2. The method of claim 1, further comprising:
replacing the safety status indicator with a second status indicator in the first vehicle processor of the first vehicle module when it is detected that the first vehicle module is present in the enabling zone.

3. The method of claim 1, further comprising:
enabling the at least one degree of freedom of movement of the first vehicle when the safety status indicator is deleted from the first vehicle processor.

4. The method of claim 1, further comprising:
replacing the safety status indicator with a second status indicator in the first vehicle processor of the first vehicle module when it is detected that the first vehicle module is present in the enabling zone; and
enabling the at least one degree of freedom of movement of the first vehicle when the second status indicator is set in the first vehicle processor.

5. The method of claim 1, wherein the degree of freedom of movement is selected from one of the following parameters: driving speed of the first vehicle, curve radius, lifting height of a lifting unit of the first vehicle, acceleration of the first vehicle, possible direction of travel of the first vehicle, maximum attainable driving speed when travelling forwards with the first vehicle, maximum attainable driving speed when travelling backward with the first vehicle, and enabled range of movement of the first vehicle.

6. The method of claim 1, wherein the step of detecting whether a first vehicle module is present in the control zone is performed by the first vehicle module.

7. The method of claim 1, further comprising:
defining a first vehicle warning zone for the first vehicle, which first vehicle warning zone is a sub-region of a third electromagnetic field provided by a first vehicle antenna unit on the first vehicle;
detecting whether a second vehicle module matched to the first vehicle warning zone is present in the first vehicle warning zone;
capturing a status indicator set in a second vehicle processor of the second vehicle module;

comparing the status indicator set in the first vehicle processor with the status indicator set in the second vehicle processor; and performing at least one follow-on operation when the status indicator set in the second vehicle processor differs from the status indicator set in the first vehicle processor.

8. The method of claim 7, further comprising:
defining a second vehicle warning zone for a second vehicle, which second vehicle warning zone is a sub-region of a fourth three-dimensional electromagnetic field provided by a second vehicle antenna unit;
receiving a configuration of the second vehicle warning zone of the second vehicle at the first vehicle module; and
detecting by the first vehicle module whether the first vehicle module is present in the second vehicle warning zone.

9. The method of claim 7, further comprising:
detecting whether the first vehicle module and the second vehicle module are approaching one another.

10. The method of claim 9, wherein the at least one follow-up operation is performed only when it is detected that the first vehicle module and the second vehicle module are approaching one another.

11. The method of claim 7, wherein the follow-on operation comprises at least one of the following steps:
providing a warning signal at the first vehicle;
providing a warning signal at a second vehicle;
restricting at least one degree of freedom of movement of the first vehicle; and
restricting at least one degree of freedom of movement of the second vehicle.

12. The method of claim 1, wherein the control zone covers a transition between a loading ramp and a transport vehicle to be loaded or unloaded.

13. The method of claim 12, further comprising:
detecting whether the first vehicle module mounted on the first vehicle is present on a loading area of the transport vehicle.

14. The method of claim 13, further comprising:
detecting whether the transport vehicle is moving; and
at least one of the steps:
providing a warning signal at the first vehicle module; and
braking the first vehicle to a stop when it is detected that the transport vehicle is moving and the first vehicle module is present on the loading area of the transport vehicle.

15. The method of claim 13, further comprising:
detecting whether the first vehicle module mounted on the first vehicle is leaving the loading area of the transport vehicle.

16. The method of claim 15, further comprising:
capturing an image of the first vehicle, the transport vehicle and/or a load of the first vehicle when it is detected that the first vehicle module is leaving the loading area of the transport vehicle.

17. The method of claim 1, further comprising:
detecting an open state of a gate disposed in the control zone,
wherein the step of monitoring a control zone only takes place when it is detected that the gate is open.

18. A logistics safety system for safeguarding a logistics area, comprising:
a control module, comprising:
a control antenna unit comprising at least one first control antenna implemented for being mounted in a predetermined spatial relationship to a loading zone of the logistics area and for generating a first three-dimensional electromagnetic field; and
a control processor connected to the control antenna unit and adapted for defining at least one control zone for the loading zone, which is a sub-region of the first three-dimensional electromagnetic field;
an enabling module, comprising:
an enabling antenna unit comprising at least one first enabling antenna implemented for generating a second three-dimensional electromagnetic field; and
an enabling processor connected to the enabling antenna unit and adapted for defining at least one enabling zone which is a sub-region of the second three-dimensional electromagnetic field, and
a first vehicle module for a first vehicle, comprising:
a first vehicle antenna unit, comprising at least one first vehicle antenna implemented for being mounted in a predetermined spatial relationship on the first vehicle, and for generating a third three-dimensional electromagnetic field, and
a first vehicle processor connected to the first vehicle antenna unit, which first vehicle processor is adapted for defining at least one first vehicle warning zone for the first vehicle, which first vehicle warning zone is a sub-region of the third electromagnetic field, wherein the first vehicle processor is adapted for detecting by the first vehicle antenna unit whether the control module matched to the first vehicle antenna unit and/or the enabling module matched to the first vehicle antenna unit is present within the first vehicle warning zone,
wherein the first vehicle processor is implemented for setting a safety status indicator in response to detecting the control module in the first vehicle warning zone, for restricting at least one degree of freedom of movement of the first vehicle when the safety status indicator is set in the first vehicle processor, and for deleting the safety status indicator in response to detecting the enabling module in the first vehicle warning zone,
wherein the safety status indicator is maintained in the first vehicle processor even when the control module leaves the first vehicle warning zone and until the enabling module is detected in the first vehicle warning zone, and wherein the safety status indicator is maintained—and therefore the restriction on the at least one degree of movement of the first vehicle—when the control module is outside the first vehicle warning zone and the enabling module is also outside the first vehicle warning zone.

19. A computer program, comprising commands causing a logistics safety system to execute a method for securing a logistics area, the method comprising:
monitoring, by a control module, only a control zone which is part of the loading zone and which is a sub-region of a first three-dimensional electromagnetic field provided by a control antenna unit;
detecting, by one of the control module or a first vehicle module, whether the first vehicle module is present in the control zone, wherein the first vehicle module is mounted on a first vehicle and is matched to the control antenna unit;
setting, by the first vehicle module, a safety status indicator in a first vehicle processor of the first vehicle module, in response to detecting the first vehicle module in the control zone;

restricting, by the first vehicle module, at least one degree of freedom of movement of the first vehicle when the safety status indicator is set in the first vehicle processor;

monitoring, by only an enabling module, an enabling zone which is part of the loading zone;

detecting, by one of the first vehicle module or the enabling module, whether the first vehicle module is present in the enabling zone;

deleting, by the first vehicle module, the first safety status indicator when it is detected that the first vehicle module is present in the enabling zone, and maintaining the safety status indicator, and therefore the restriction on the at least one degree of movement of the first vehicle, when the first vehicle is in an area of the loading zone that is outside of the control zone and outside of the enabling zone, wherein the safety status indicator is maintained in the first vehicle processor even when the first vehicle module leaves the control zone and until the first vehicle module is detected in the enabling zone.

20. The method of claim 1, wherein detecting whether the first vehicle module is present in the control zone comprises:

detecting, by the control module, that the first vehicle module is present in the control zone, and in response to detecting that the first vehicle module is present in the control zone, refraining from continuing to monitor said first vehicle module.

* * * * *